US009584867B2

(12) United States Patent
McRae

(10) Patent No.: US 9,584,867 B2
(45) Date of Patent: Feb. 28, 2017

(54) SELECTING REMOTE SERVICES THROUGH AN ELECTRONIC PROGRAM GUIDE

(75) Inventor: Matthew Blake McRae, Laguna Beach, CA (US)

(73) Assignee: Vizio Inc, Irvine, CA (US)

( * ) Notice: Subject to any disclaimer, the term of this patent is extended or adjusted under 35 U.S.C. 154(b) by 793 days.

(21) Appl. No.: 12/824,418

(22) Filed: Jun. 28, 2010

(65) Prior Publication Data

US 2011/0317079 A1    Dec. 29, 2011

(51) Int. Cl.
*H04N 5/445* (2011.01)
*H04N 21/482* (2011.01)
*H04N 21/41* (2011.01)
*H04N 21/475* (2011.01)
*H04N 21/81* (2011.01)

(52) U.S. Cl.
CPC ....... *H04N 21/482* (2013.01); *H04N 21/4113* (2013.01); *H04N 21/4753* (2013.01); *H04N 21/8153* (2013.01)

(58) Field of Classification Search
None
See application file for complete search history.

(56) References Cited

U.S. PATENT DOCUMENTS

| | | | | |
|---|---|---|---|---|
| 5,550,576 A * | 8/1996 | Klosterman | ............. | 725/46 |
| 6,219,839 B1 * | 4/2001 | Sampsell | ............. | 725/40 |
| 6,801,713 B1 * | 10/2004 | Yagawa et al. | ............. | 386/241 |
| 6,959,449 B1 * | 10/2005 | Fujii | ............. | 725/110 |
| 2001/0000194 A1 | 4/2001 | Sequeira | | |
| 2001/0011373 A1 * | 8/2001 | Inoue | ............. | 725/50 |
| 2002/0073424 A1 * | 6/2002 | Ward et al. | ............. | 725/43 |
| 2002/0174430 A1 * | 11/2002 | Ellis et al. | ............. | 725/46 |
| 2004/0078807 A1 * | 4/2004 | Fries et al. | ............. | 725/48 |
| 2005/0097601 A1 * | 5/2005 | Danker et al. | ............. | 725/39 |
| 2006/0015900 A1 * | 1/2006 | Cezeaux et al. | ............. | 725/40 |
| 2006/0288366 A1 * | 12/2006 | Boylan et al. | ............. | 725/40 |
| 2009/0055868 A1 * | 2/2009 | Wehmeyer et al. | ............. | 725/40 |
| 2010/0293575 A1 * | 11/2010 | Biniak | ............. | 725/40 |
| 2011/0167448 A1 * | 7/2011 | Schein et al. | ............. | 725/40 |

* cited by examiner

*Primary Examiner* — Brian T Pendleton
*Assistant Examiner* — Dika C. Okeke
(74) *Attorney, Agent, or Firm* — Law Office of Scott C Harris, Inc

(57) ABSTRACT

A system includes a television that has access to one or more services hosted on provider servers through a network. The television has software that displays both program information and services information in an electronic program guide. Upon selecting of a program information entry in the electronic program guide, the software changes the current channel of the television to the channel associated with the program entry information. Upon selecting of one of the services entries in the electronic program guide, the software presents a browsing menu to the viewer, the browsing menu presenting pages from the provider servers and accepting inputs from the viewer.

24 Claims, 14 Drawing Sheets

SELECTING REMOTE SERVICES THROUGH AN ELECTRONIC PROGRAM GUIDE

CROSS-REFERENCE TO RELATED APPLICATION

This application is related to U.S. patent application titled "SELECTING TELEVISION INPUTS THROUGH AN ELECTRONIC PROGRAM GUIDE," application Ser. No. 12/824,491, filed Jun. 28, 2010. This application is also related to U.S. patent application titled "SELECTING ATTACHED CONTENT THROUGH AN ELECTRONIC PROGRAM GUIDE," application Ser. No. 12/824,409, filed Jun. 28, 2010.

FIELD

This invention relates to the field of television devices and more particularly to a system for providing selection and manipulation of input devices from within an electronic program guide user interface of a television.

BACKGROUND

Televisions have tuners for receiving broadcast television from cable or radio frequency inputs. In the early days, only a few stations broadcast over radio waves and there was no cable or satellite service. In those days, analog transmission was used to distribute programming of only a few stations over the Very High Frequency bands (VHF). Later, additional stations were added in the Ultra High Frequency (UHF) bands. In any given area, three to maybe 30 stations were available. In the early days, paper guides were the primary mechanism used for a viewer to determine what program was to be shown on what channel. For example, the magazine TV Guide presented a listing of what programs were on what stations in a time-sorted list (e.g., one page has listings for what programs were on each station at 7:00 PM). This was fine for a few stations such as channel 2, 4, 5, 7, 9, 11 and 13 in the New York City suburban area in 1960, but soon became difficult to produce and cumbersome to use when the number of stations increased. It soon became difficult to manage, to produce and difficult for the viewer to find programs. Additionally, the printing cycle of such guides was often weekly and if a change to programming occurred after a cutoff point, the change was not reflected in the guide, making the guide inaccurate at times.

In parallel with analog broadcast television, many viewers made the switch to cable television that offered hundreds of channels, including some of the broadcast channels. Cable added many new channels, including premium channels that require a subscription fee and pay-per-view programs in which the viewer pays a fee to watch, for example, a sporting event or movie. Early cable systems published their own weekly or monthly guide, but this was difficult to use due to the large number of stations and the limited print space. In addition, many cable systems added a dedicated station having a rolling program guide. This was a very early electronic program guide (EPG) and listed the programs for each station/channel that are currently being shown or will be shown within the next two hours or so. Because most cable systems had 50-150 stations/channels, the guide scrolled though the channels sequentially. If you wanted to know what was to be shown on Channel 10 and the display currently shows channel 20, you would have to wait for all of the channels between 20 and the last channel, then channel 1 and channel 9 to scroll by before channel 10 was displayed. Then you had a short time to focus in on channel 10 and read what was to be shown. This soon became useless as the number of channels kept increasing.

Cable soon found a competitor. Satellite television providers transmitted over 100 channels to one or more geostationary satellites and each satellite retransmitted the channels back towards earth for reception on large satellite antennas, often six to 9 feet wide. Many subscribers were attracted to satellite television because of the breadth and type of content available, but many were alienated to satellite television because of the unsightly antenna in their back yard. Apartment dwellers, condominium owners and town home owners did not have a place for such antenna. Eventually, two major satellite television providers launched similar satellite services that required much smaller dish antenna, approximately one foot in diameter, appealing to a much greater audience. Each provider offered over 100 digital television stations, including pap-per-view programs and premium (subscription) stations.

Since there was a limited bandwidth available for each satellite, the number of stations for each satellite was limited, preventing the transmission of local stations. A large number of subscribers received the same stations, so many still relied on terrestrial broadcasts for local news, traffic and weather. For example, the entire east coast of the United States received the same stations, leading to the birth of news and weather networks such as CNN and TWC. Therefore, there were very few local stations unless, for example, you lived in New York City.

The satellite broadcast received by the antenna was decoded by a set-top box and down-converted to an unused broadcast station to feed an existing television (early televisions did not have external inputs such as Composite, S-Video, HDMI, etc). There needed to be a way to select one of the stations out of the many since the television was fixed to one station, usually channel 2 or channel 3, rendering the television tuner somewhat useless in selecting the myriad of stations that were available. Selecting of the stations was accomplished though a remote control that interfaced to the set-top box, having direct channel addressing (e.g. enter 1-0-1 to change to channel 101) or up/down addressing (e.g. press the up arrow to get to the next station). Early providers offered weekly paper program guides. With over 100 stations, these guides often proved difficult to use. As an improvement, satellite providers (and third-party providers) started offering what became known as an electronic program guide. In this, the providers downloaded an electronic program guide to the user's set-top box, either through the satellite system or over phone lines, then presented the guide in a menu on the user's television. The user had the ability to move ahead or back in time (right arrow/left arrow) and up and down in the station list (up arrow/down arrow), seeing what programs are on what stations at what time. Features such as page up/down and direct station addressing were also provided.

Broadcast television later migrated to a digital spectrum, greatly increasing the number of stations and sub-stations (e.g. NBC, NBC1, NBC2, etc). There are often many different channels or stations of programs or content from which a viewer of the television is able to select. For example, some cable systems offer hundreds of cable channels containing content such as network television programming (ABC, NBC, CBS, etc), music channels, movie channels (HBO, SHO, MAX), and so fourth.

Electronic program guides became available for cable television, satellite television and digital broadcast television. The electronic program guides provide information regarding the programs available from the content sources such as the content broadcast over the air waves, through satellites, or through cables (copper or fiber optic) and all let the viewer select the content that they wish to view.

Lately, many other sources of content (audio, video, still pictures, etc) have been connected to the television in many different ways. Some sources of content are connected or interfaced directly to the television such as insertion of a disk containing pictures, video, music, etc. or connecting a disk (e.g. USB jump drive) containing pictures, video, music, etc. Some sources of content are connected to the television through a network such as content stored on network attached storage (NAS) or content on a computer system connected to the television through a local area network. Similarly, content is also provided by servers remotely connected to the television through, for example, the Internet. An example of content servers is a movie rental companies such as Netflix. Previously, access to content from these types of media, drives and servers required an external device (e.g. set-top box, disk player) and a separate user interface. Now, many television devices are connected to networks, having access to content stored locally on the network and remotely on, for example, the Internet. Additionally, many television devices provide direct connection of media through ports such as Universal Serial Bus (USB) ports and the like. Accessing content on the network and on connected devices often requires that the viewer perform different actions using different menu systems and/or different controls.

What is needed is a system provides listing, manipulation and access to devices through the electronic program guide interface.

SUMMARY

A television has access to one or more services hosted on provider servers through a network. The television has software that displays both program information and services information in an electronic program guide. Upon selecting of a program information entry in the electronic program guide, the software changes the current channel of the television to the channel associated with the program entry information. Upon selecting of one of the services entries in the electronic program guide, the software presents a browsing menu to the viewer, the browsing menu presenting pages from the provider servers and accepting inputs from the viewer.

In one embodiment, a system for accessing services from a provider server is disclosed. The provider server is connected to a television through a network and the television has a display. The system includes a mechanism for displaying in an electronic program guide on the display. The electronic program guide includes program information and information regarding the services from the provider server. The system also includes a mechanism for selecting the information regarding the services using the electronic program guide and responsive to selecting the information regarding the services, an interface for browsing the services from the provider server is displayed on the display of the television.

In another embodiment, a method of accessing services is disclosed. The services are provided by one or more provider servers, each connected to the television through a network and the television has a display. The method includes (a) displaying television program information in an electronic program guide on the display. The television program information includes channel and program data for at least one television program. Next, (b) a description of at least one of the services is displayed in the electronic program guide and (c) a highlight selector is displayed over a current location. The current location is at either one of the television programs or at one of the descriptions of the services after (d) receiving a directive, (e) if the directive is a directional directive, the current location is changed and the method repeats from step a. (f) If the directive is a selection directive and the current location is over one of the television programs, the current channel of the television is changed to the one of the television programs. (g) If the directive is a selection directive and the current location is over one of the descriptions of the services, a browsing menu is displayed. The browsing menu provides a mechanism for accessing the services associated with the one of the descriptions.

In another embodiment, a television is disclosed including a processor that has access to program information regarding content. The content is available on at least one channel that is accessible by the television. A display is operably interfaced to the processor. There are at least one service hosted by a provider server and the provider server is accessible by the processor through a network. Software running on the processor displays a subset of the program information and information regarding the at least one service in an electronic program guide and software running on the processor displays a highlight selector on the electronic program guide. Selection of one of the services results in a browsing menu on the television for accessing the selected service.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
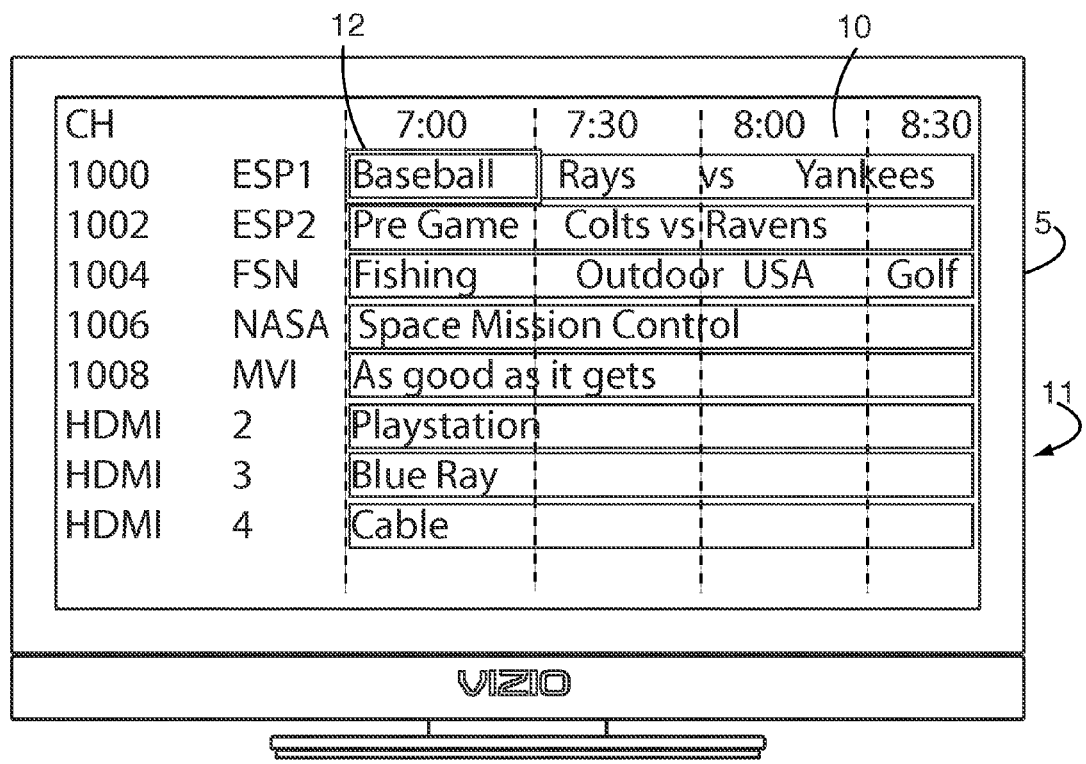
FIG. 1 illustrates a view of a television showing an exemplary electronic program guide.

Reference will now be made in detail to the presently preferred embodiments, examples of which are illustrated in the accompanying drawings. Throughout the following detailed description, the same reference numerals refer to the same elements in all figures. Although the following explanation use a typical television as an example, many other devices that have a display are anticipated, including, but not limited to, digital still cameras, digital video cameras, portable televisions, portable media players, cellular phones, etc.

Referring to FIGS. 1-5, views of a television 5 showing exemplary electronic program guide user interfaces 10/14/16 are shown. There are many ways to portray an electronic program guide on a display of, for example, a television 5, and the electronic program guide 10 described here within is but one example, wherein many other arrangements, formatting, highlighting, addressing mechanisms are anticipated, all of which are included here within.

In the exemplary user interface 10 shown in FIG. 1, there is a typical channel grid with the channel indicators (e.g. numbers) organized vertically in rows (1000, 1002, etc) and time organized horizontally in columns (e.g. 7:00, 7:30, etc). In some program guides, station identification (ESP1, ESP2, etc) are provided next to the channel indicators. At each grid intersection or spanning several horizontal grid intersections are content descriptions (e.g. Baseball Rays vs. Yankees) for each station.

For selecting a channel/program, a highlight selector 12 provides focus. As shown in FIG. 1, the highlight selector 12 is shown to be focused over the intersection of channel 1000 and the time 7:00, at which is the program, "Baseball Rays vs. Yankees." This is the current location. The typical remote control 111 (see FIGS. 22 and 23) has keys or controls to move the highlight selector 12, for example, up, down, left and right arrow keys, touch pads, etc. The viewer uses these keys to position the highlight selector 12 over a program of interest, changing the current location. Once at the desired program, one or more functions are performed such as requesting additional information (info key) or changing to the program at the current location (select key).

In some systems, a fuller description of a program is provided in the user interface when the program is highlighted, for example, in an information box. In some user interfaces, pressing a different key (e.g. an "info" key) provides additional description of the program. In some user interfaces, pressing a "select" key causes the tuner to switch to the channel that is currently highlighted. For example, in the program guide 10 shown in FIG. 1, pressing the select key causes the television 5 (or set-top box, etc) to tune into channel 1000 to view the baseball game.

In the past, horizontal lines of such exemplary electronic program guide user interfaces 10 were restricted to tunable stations or channels. Many television devices 5 have alternate inputs connected to other devices such as cable/satellite receivers (set-top boxes), media players, etc. In the past, to view content from any of these devices, a different user interface was provided. For example, the remote control 111 had a dedicated key labeled "input" and, successive invocations of the "input" key transitioned the television device 5 sequentially through each of the possible inputs (e.g. Tuner→HDMI1→HDMI2→HDMI3→HDMI4→ Analog→ Tuner, etc). Often, the viewer becomes very accustomed to using the electronic program guide and associated remote control features and finds the input changing interfaces and finding special keys difficult to master, especially in low-lit rooms.

In this embodiment, the electronic program guide interface 10 has three additional horizontal lines 11 for three different inputs, HDMI2, HDMI3 and HDMI4. Although the time slots are not necessarily used for the input port horizontal lines 11, the position in the exemplary electronic program guide user interface 10 are populated with a description of the devices attached to each input. For example, HDMI2 is connected to a PlayStation, HDMI3 is connected to a BlueRay disk player and HDMI4 is connected to a Cable (Set-top-box). It is anticipated that the description is entered through a setup user interface or is discovered automatically through the interface (e.g. HDMI interface). It is also anticipated that, in embodiments in which the description is discovered through the interface, the description optionally includes a description of content loaded or accessible from the device. For example, if the movie "Cars" is currently loaded in the BlueRay player that is connected through HDMI3, then the description for HDMI3 is "BlueRay: Cars". In another example, if the Cable set-top-box is currently tuned to channel 47 and the movie "Casablanca" is showing in channel 47, then the description for HDMI4 is: "Cable: CH47, Casablanca". Many variations are anticipated.

Figure 2:
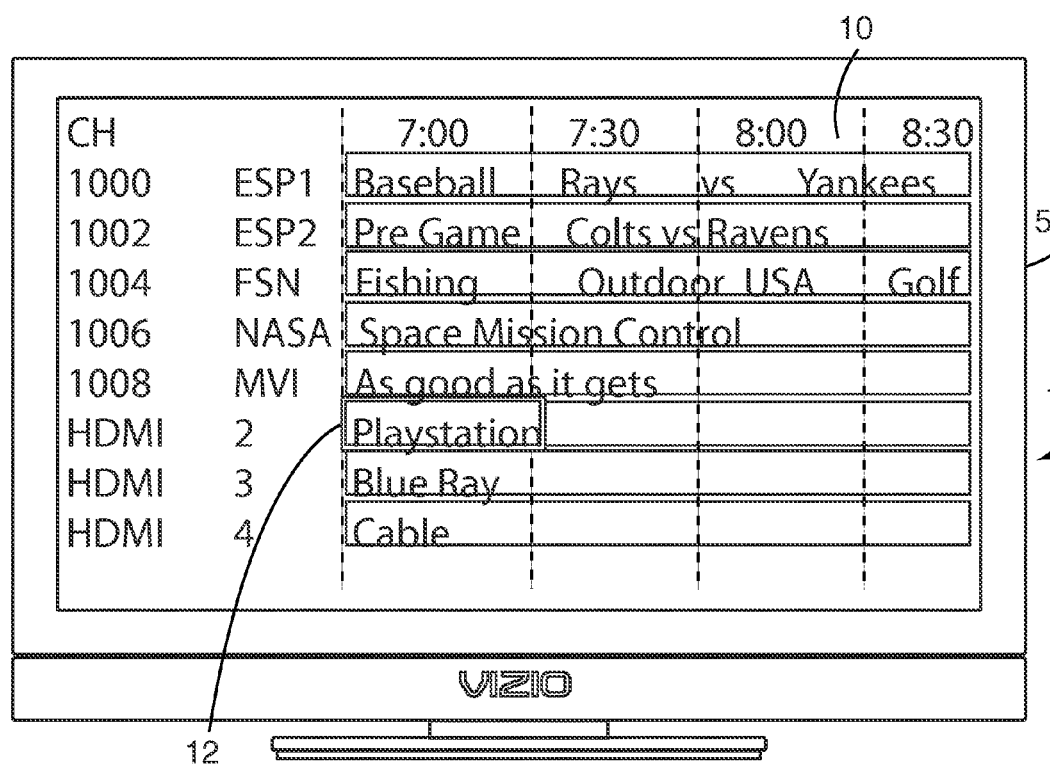
FIG. 2 illustrates a view of a television showing a second view of the exemplary electronic program guide.

In FIG. 2, the highlight selector 12 is shown over "PlayStation." For example, the viewer pressed the down arrow key five times to move the highlight selector 12 from "Baseball" down to "PlayStation." At this point, the electronic program guide user interface 10, for example, provides for the selection of this input (HDMI2), for example by pressing the "select" button on the remote control 111. In this example, pressing the "select" key results in the input of the television 5 changing to HDMI2, to which the PlayStation is connected since the current location is at the PlayStation of the electronic program guide 10. In embodiments in which the connection (e.g. HDMI2) provides discovery information, the electronic program guide user interface 10, for example, provides additional information of for input (HDMI2), for example by pressing the "info" button on the remote control 111. As an example of this, responsive to the "info" button, the user interface presents the title of a game currently loaded on the PlayStation, etc.

Figure 3:
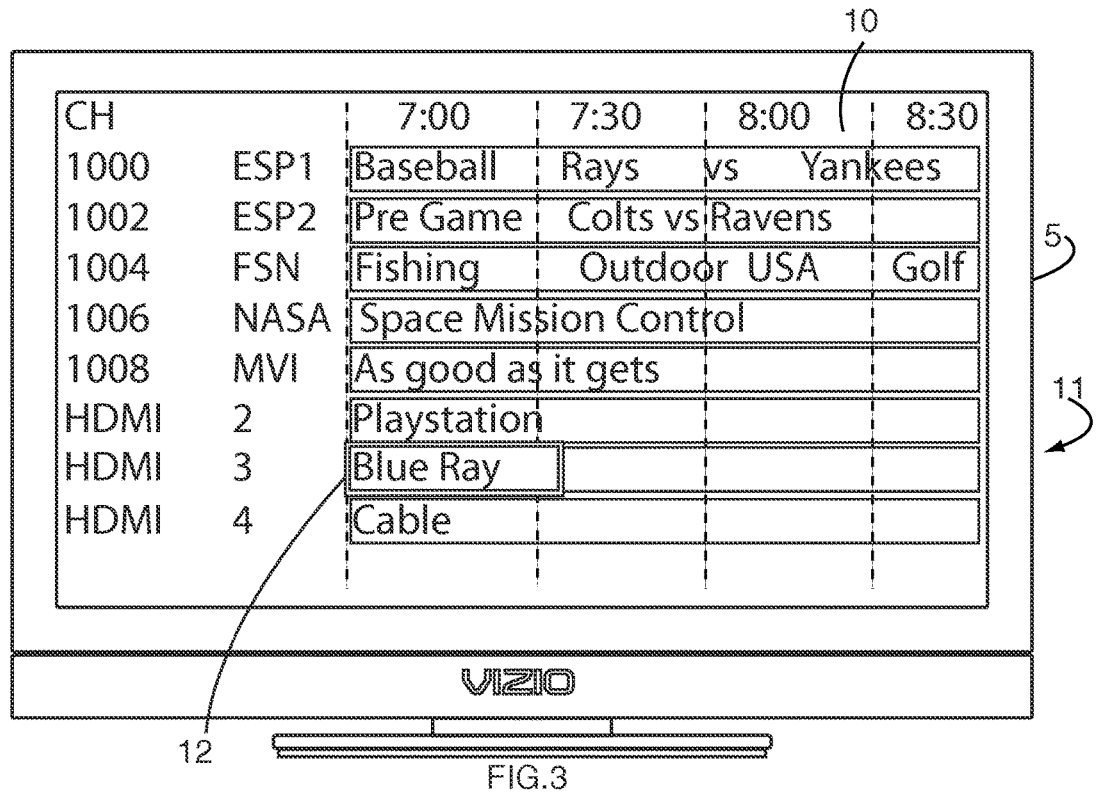
FIG. 3 illustrates a view of a television showing a third view of the exemplary electronic program guide.
Figure 4:
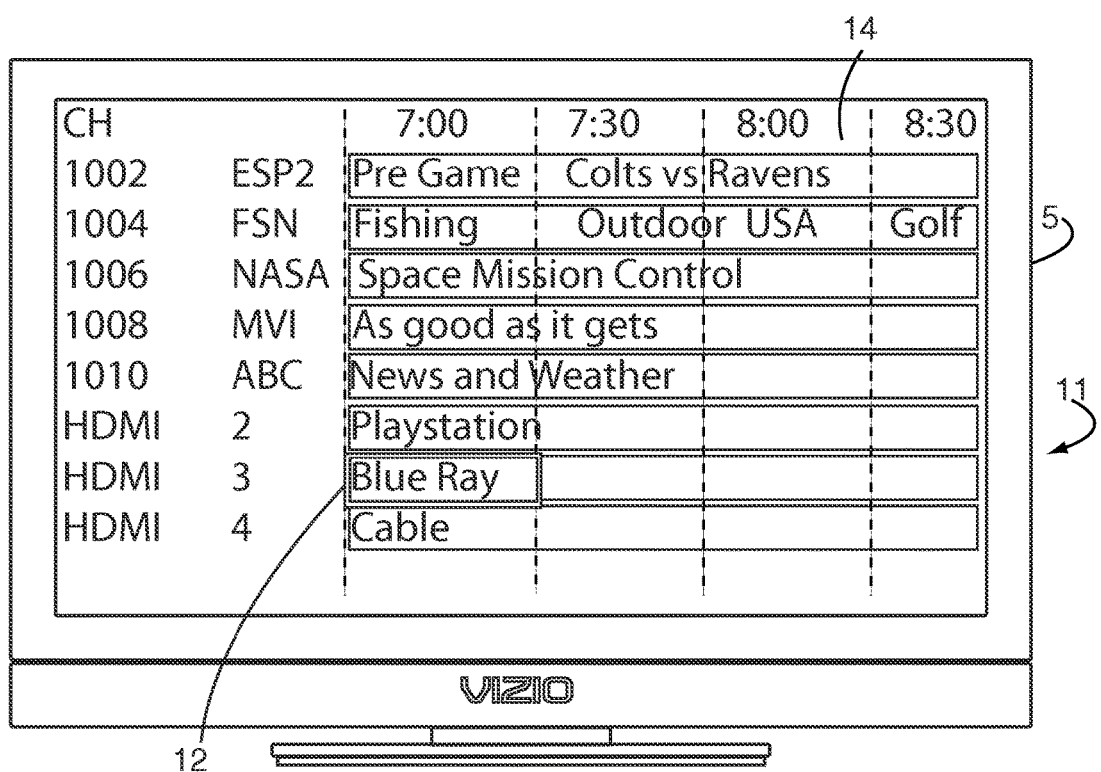
FIG. 4 illustrates a view of a television showing a fourth view of the exemplary electronic program guide.

In FIG. 3, the highlight selector 12 is shown over "BlueRay." For example, the viewer pressed the down arrow key one more time to move the highlight selector 12 from "PlayStation" to "BlueRay." At this point, the electronic program guide user interface 10, for example, provides for the selection of this input (HDMI3), for example by pressing the "select" button on the remote control 111. For example, pressing the "select" key results in the input of the television 5 changing to HDMI3, to which the BlueRay player is connected. In embodiments in which the connection (e.g. HDMI3) provides discovery information, the electronic program guide user interface 10, for example, provides additional information of for input (HDMI3), for example by pressing the "info" button on the remote control 111. In this, for example, responsive to the "info" button, the user interface presents the title and optionally a description of a disk currently loaded on the BlueRay player, etc.

Scrolling is an important feature of electronic program guides because there are so many channels (and inputs) and limited real estate on the display 7 (see FIG. 22) of, for example, a television 5. Therefore, practically all electronic program guide user interfaces 10 provide scrolling features. In this example, the viewer, through the use of the "down arrow" key, has moved the highlight selector 12 from "BlueRay" to "Cable" and then pressed the "down arrow" key one more time, causing a scroll operation as shown in the electronic program guide user interface 14 of FIG. 4. In this example, the first horizontal line (channel 1000) is gone and the subsequent channels (1002 to 1008) are moved up to fill the void. In this example, the inputs section 11 (HDMI2-HDMI4) remain in a constant position, leaving a space between the channels (1002 to 1008) and the input section 11 that is filled with a next channel (1010) having a description of "News" and Weather." This is an example of a user interface in which the input section 11 is locked in position and the other lines (e.g. channels) scroll while the input section 11 remains at, for example, the bottom of the guide 14.

Figure 5:
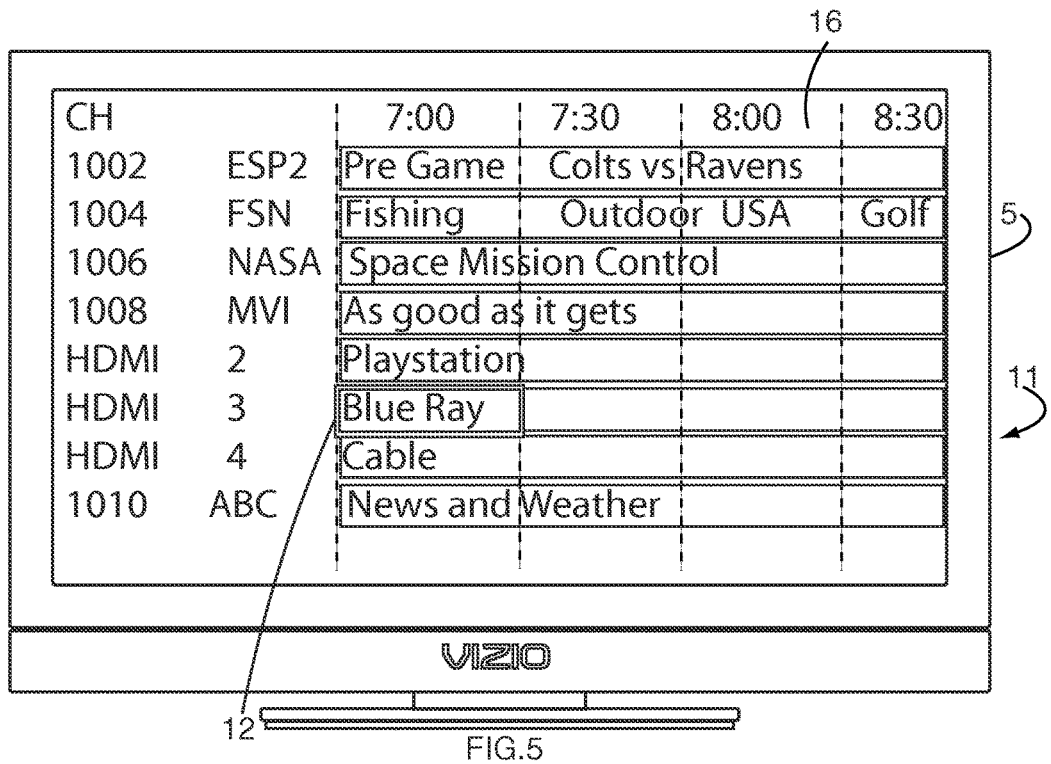
FIG. 5 illustrates a view of a television showing a fifth view of the exemplary electronic program guide.

In another example shown in FIG. 5, the viewer, through the use of the "down arrow" key, has moved the highlight selector 12 from "BlueRay" to "Cable" in the interface 10 of FIG. 3 and then pressed the "down arrow" key one more time, causing a scroll operation as shown in the electronic program guide user interface 16 of FIG. 5. In this example, the first horizontal line (channel 1000) is erased and the subsequent channels (1002 to 1008) are moved up to fill the void. In this embodiment, the inputs section 11 (HDMI2-HDMI4) has also moved up, leaving a space below the input section 11 that is filled with a next channel (1010) having a description of "News" and Weather." This is an example of a user interface in which the input section 11 scrolls with the other lines (e.g. channels) and, through subsequent operations of the arrow keys, eventually, the input section 11 will scroll off of the user interface 16 as did channel 1000. These are but examples of scrolling operations within electronic program guide user interfaces 10/14/16 and many other similar or different operations are anticipated. In some embodiments, the special lines of the user interface (e.g. input section 11) remain in position while other lines (e.g. channel lines) scroll while on other embodiments, all lines scroll with equal priority. In some embodiments, the special lines (e.g. input selection 11) are assigned unused channel numbers (e.g. HDMI2 is 3000, HDMI3 is 3001, HDMI4 is 3002), enabling direct access to the inputs section 11. For example, entering "3", "0", "0", "0" directly addresses HDMI2 and the user interface line for HDMI2 is, for example, "3000 HDMI2 PlayStation".

Referring to FIGS. 6-11, views of a television 5 showing exemplary electronic program guide user interfaces 30/32/34/36/38 are shown. There are many ways to portray an electronic program guide on a display of, for example, a television 5, and the electronic program guide 30/32/34/36/38 described here within is but one example, wherein many other arrangements, formatting, highlighting, addressing mechanisms are anticipated, all of which are included here within.

Figure 6:
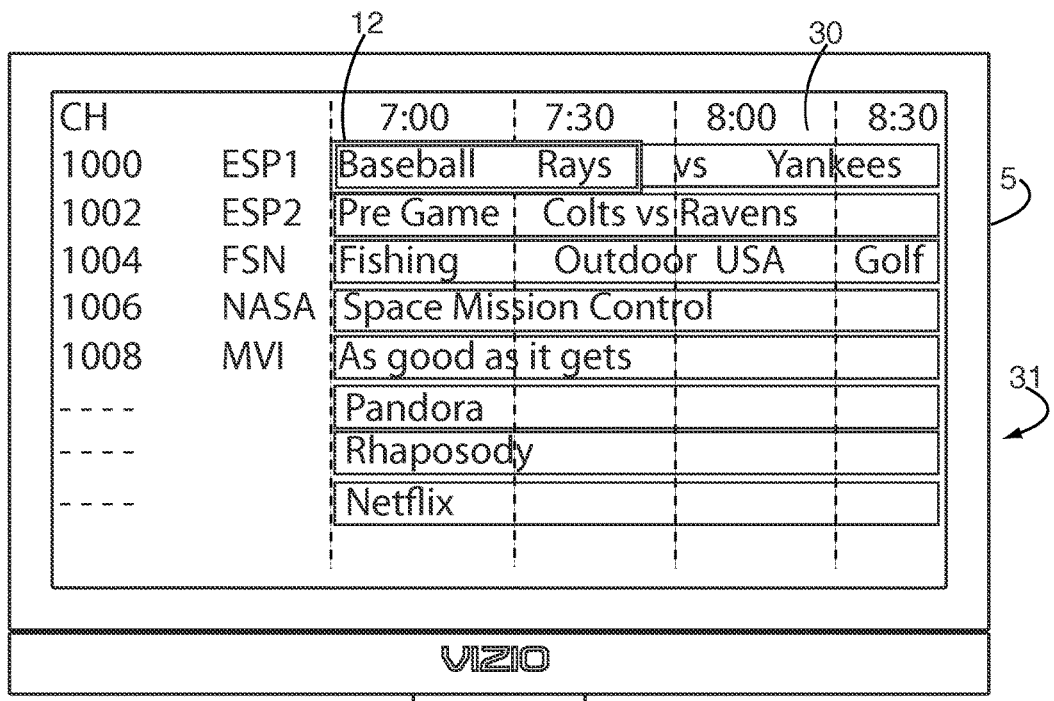
FIG. 6 illustrates a view of a television showing a sixth view of the exemplary electronic program guide.

In the exemplary user interface 30 shown in FIG. 6, there is a typical channel grid with the channel indicators (e.g. numbers) organized vertically (1000, 1002, etc) and time organized horizontally (e.g. 7:00, 7:30, etc). Station identification (ESP1, ESP2, etc) are provided next to the channel indicators. At each grid intersection or spanning several horizontal grid intersections are content descriptions (e.g. Baseball Rays vs. Yankees) for each station.

To select, for example, a program, a highlight selector 12 provides focus. As shown in FIG. 6, the highlight selector 12 is shown to be focused over the intersection of channel 1000 and the time 7:00, at which is the program, "Baseball Rays vs. Yankees." The typical remote control 111 (see FIGS. 22 and 23) has keys or controls to move the highlight selector 12, for example, up, down, left and right arrow keys. The viewer uses these keys to position the highlight selector 12 over a program of interest. In some systems, a fuller description of a program is provided in the user interface when the program is highlighted. In some user interfaces, pressing a different key (e.g. an "info" key) provides additional description of the program. In some user interfaces, pressing a "select" key causes the tuner to switch to the channel that is currently highlighted. For example, in the program guide 30 shown in FIG. 6, after pressing the select key, the television 5 (or set-top box, etc) tunes to channel 1000 to view the baseball game.

In the past, horizontal lines of such exemplary electronic program guide user interfaces 30 were restricted to tunable stations or channels. Many television devices 5 are connected to, for example, the Internet and have access to services such as Pandora, Rhapsody, YouTube and Netflix. In the past, to view content from on of these services, a different user interface was provided. For example, the viewer was required to access a computer, access the service and download a movie either to their computer or to the television 5 before the movie could be viewed.

This embodiment of a new electronic program guide interface 30 has three additional horizontal lines 31 showing an example of three services, Pandora, Rhapsody and Netflix. Although the time slots are not necessarily used for the services 31 horizontal lines, the positions in the electronic program guide user interface 30 are populated with a description of the services available. For example, the first horizontal line describes Pandora, the second Rhapsody and the third Netflix. It is anticipated that the description is entered through a setup user interface or is discovered automatically through the network (e.g. Internet). It is also anticipated that, in embodiments in which the description is discovered through the network, the description optionally includes a description of the service. For example, the description next to "Netflix" indicates that it is a "Movie Rental Service." Many variations are anticipated.

Figure 7:
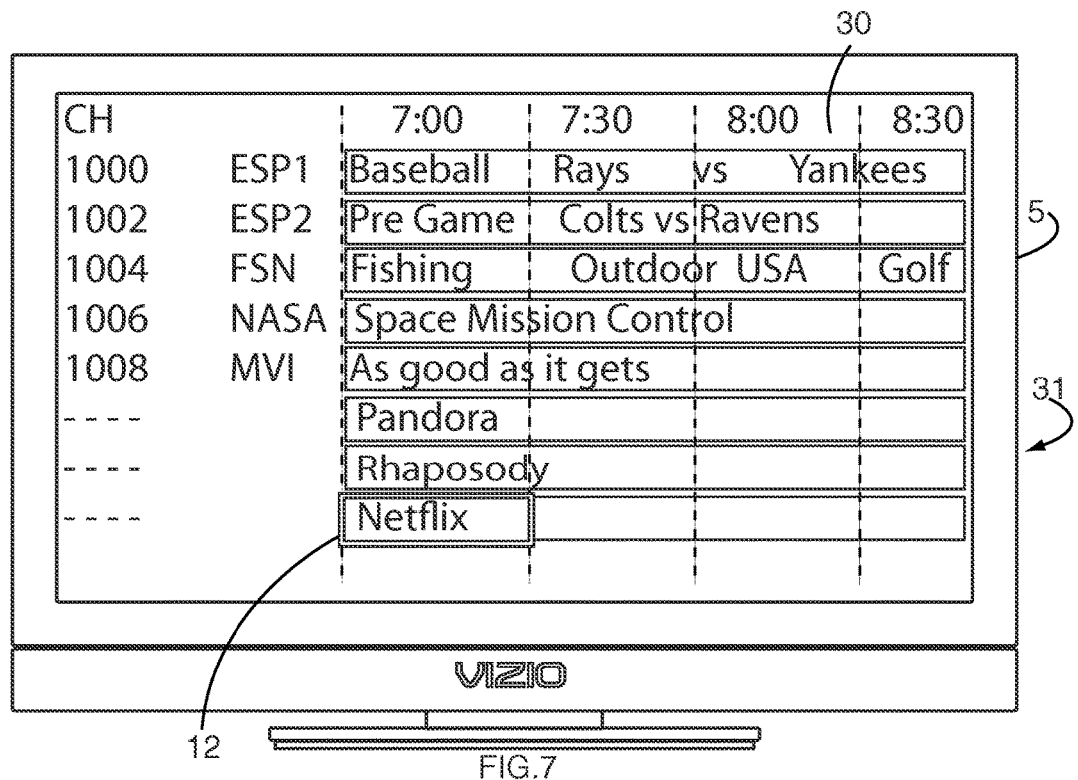
FIG. 7 illustrates a view of a television showing a seventh view of the exemplary electronic program guide.

In FIG. 7, the highlight selector 12 is shown over "Netflix." For example, the viewer pressed the down arrow key seven times to move the highlight selector 12 from "Baseball" down to "Netflix." At this point, the electronic program guide user interface 30, for example, provides for the selection of this service (Netflix), for example by pressing the "select" button on the remote control 111. In this, after pressing the "select" key, the television 5 connects to the provider server 84/94 (see FIG. 23) and displays, for example, a provider (e.g. Netflix) web page or a Netflix web page specifically formatted for a television interface (see FIG. 11). It is anticipated that some services will provide web pages specifically formatted for display on televisions 5.

Again, scrolling is an important feature of electronic program guides because there are so many channels (and inputs) and limited real estate on the display of, for example, a television 5. Therefore, practically all electronic program guide user interfaces 30 provide scrolling features. In this example, the viewer, through the use of the "down arrow" key, has moved the highlight selector 12 from "Baseball" to "Netflix" and then pressed the "down arrow" key one more time, causing a scroll operation as shown in the electronic program guide user interfaces 32/34/36 of FIGS. 8, 9 and 10.

Figure 8:
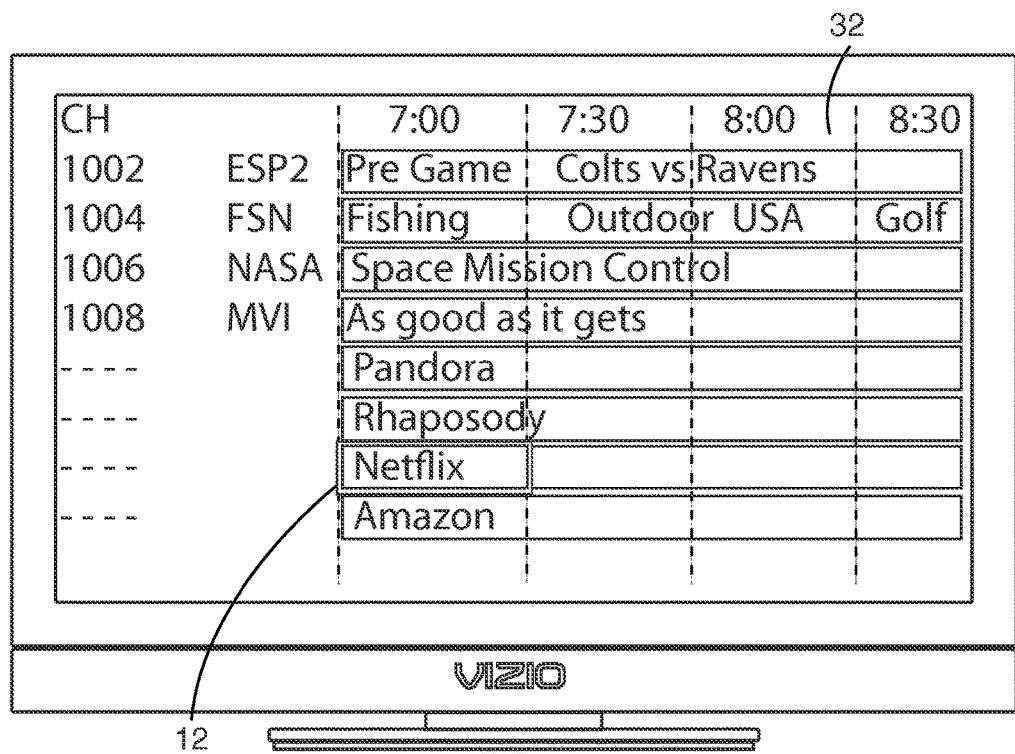
FIG. 8 illustrates a view of a television showing an eight view of the exemplary electronic program guide.
Figure 9:
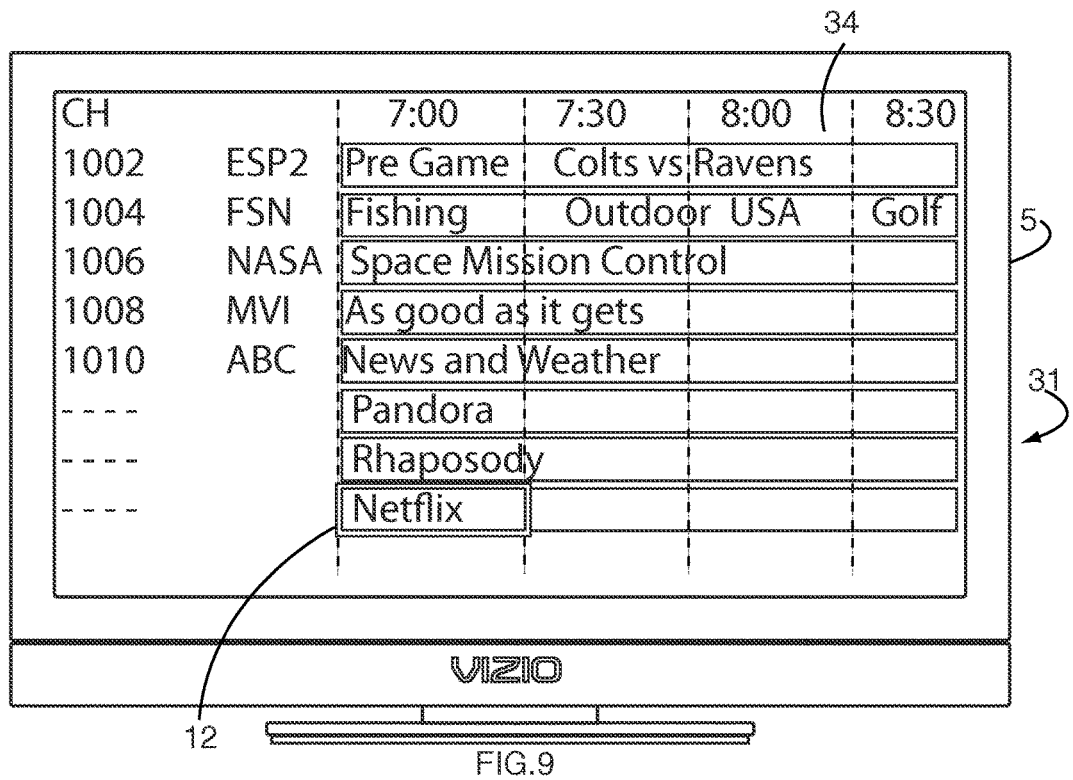
FIG. 9 illustrates a view of a television showing a ninth view of the exemplary electronic program guide.

As shown in FIG. 8, the viewer, through the use of the "down arrow" key, has moved the highlight selector 12 from "Baseball" to "Netflix" and then pressed the "down arrow" key one more time, causing a scroll operation as shown in the electronic program guide user interface 32. In this embodiment, the first horizontal line (channel 1000) is gone and the subsequent channels (1002 to 1008) are moved up to fill the void. The services section 31 (Pandora . . . Netflix) has also moved up, leaving a space below the services section 31 that is filled with either a channel (not shown), an input (e.g. HDMI2) or another service (Amazon). This is an example of a user interface in which the services section 31 scrolls with the other lines (e.g. channels) and, through subsequent operations of the arrow keys, eventually, the services section 31 will scroll off of the user interface 32 as did channel 1000. These are but examples of scrolling operations within electronic program guide user interfaces 30/32/34 and many other similar or different operations are anticipated. In some embodiments, the special lines of the user interface (e.g. input selectors 11 or services 31) remain in position while other lines (e.g. channel lines) scroll (as shown in FIG. 9) while on other embodiments, all lines scroll with equal priority. In some embodiments, the special lines (e.g. input selectors 11 or services 31) are assigned unused channel numbers (e.g. Pandora is 3000, Rhapsody is 3001, Netflix is 3002), enabling direct access to the services section 31. For example, entering "3", "0", "0", "0" directly addresses Pandora and the user interface line for Pandora is, for example, "3000 Pandora".

In the example shown in FIG. 9, the first horizontal line (channel 1000) is gone and the subsequent channels (1002 to 1008) are moved up to fill the void. The services section 31 remain constant leaving a space between the channels (1002 to 1008) and the services section 31 that is filled with a next channel (1010 ABC) having a description of "News" and Weather." This is an example of a user interface 34 in which the services section 31 is locked in position and the other lines (e.g. channels) scroll while the services section 31 remains at, for example, the bottom of the electronic program guide user interface 34.

Figure 10:
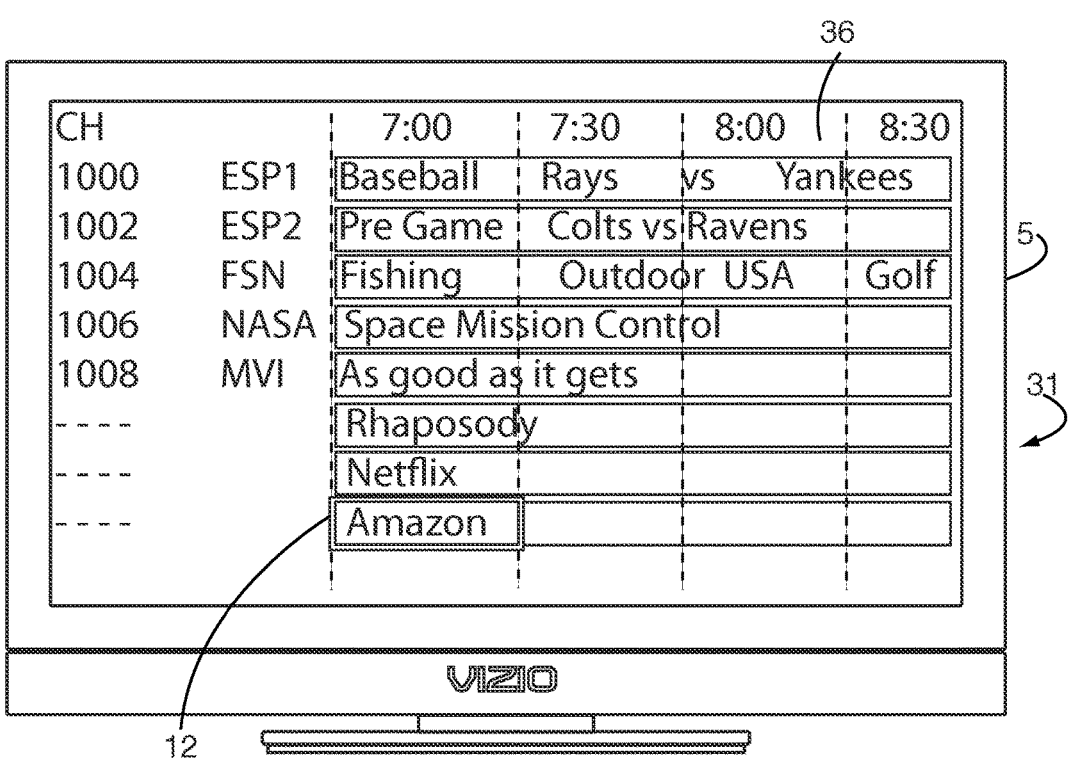
FIG. 10 illustrates a view of a television showing a tenth view of the exemplary electronic program guide.

In the example shown in FIG. 10, the channel section lines (channel 1000-1008) remain in position during one scroll operation. The services section 31 scrolls, by using, for example, a different up and down key. In this example of a user interface 36 in which the services section 31 scrolls independently, the first service (Pandora) is erased and the other two are moved up to replace it (Rhapsody and Netflix) and a next service (Amazon) is added at the bottom. Again, there are many ways to scroll in user interfaces 30/32/34/36, all of which are included here within.

Figure 11:
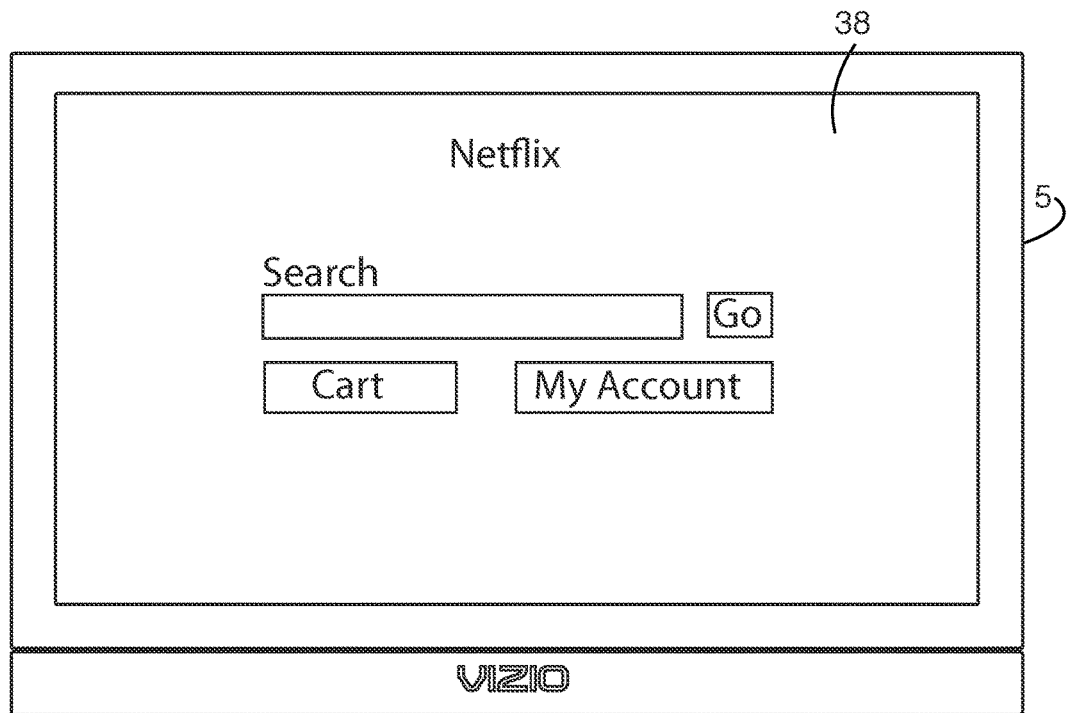
FIG. 11 illustrates a view of a television showing an exemplary web content menu.

In FIG. 11, the highlight selector 12 was placed over Netflix (as in FIG. 9) and, for example, the select function was operated. In this, the television 5 accesses the Netflix web site and displays web pages in, for example, a browser as shown in FIG. 11. FIG. 11 shows a very simplified Netflix web page for brevity purposes. It is anticipated that, due to the capabilities of some input devices (e.g. remote 111) of televisions 5, mirror web pages are accessible at such service web sites, for example, addressing a URL for Netflix.tv instead of Netflix. This simplified user interface 38 provides for searching the Netflix service for movies. In some embodiments, after finding a desired movie, the movie is streamed directly to the television 5 and shown to the viewer. In some embodiments, the movie/content is stored or cached on storage 101 (see FIG. 23) local to the television 5.

Figure 12:
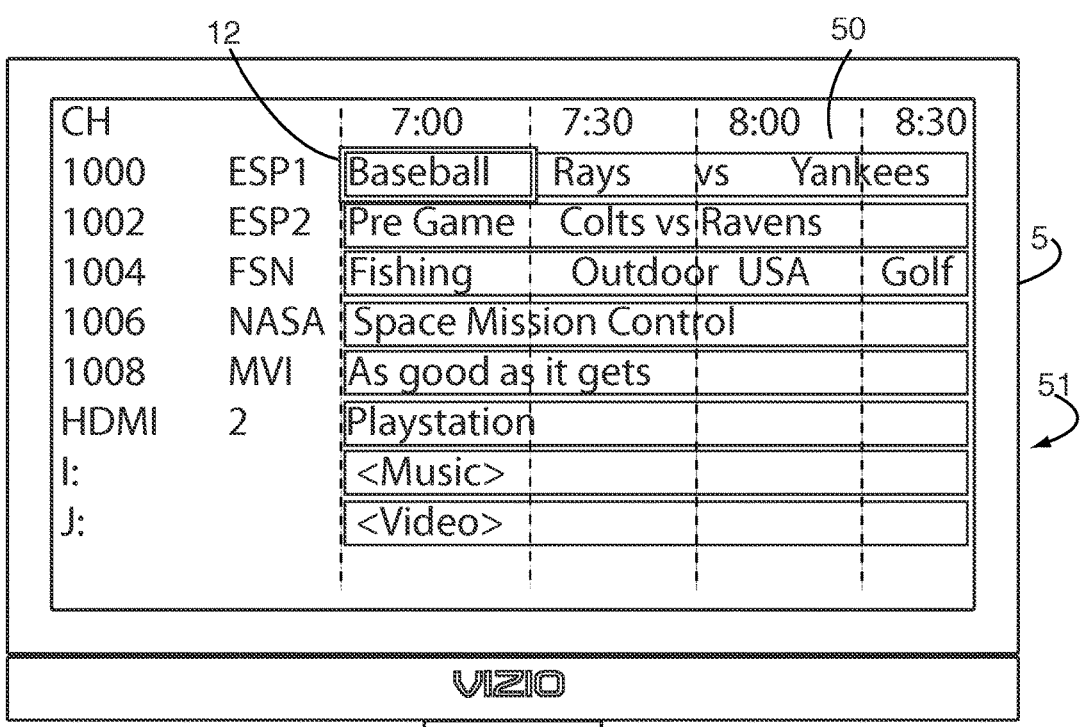
FIG. 12 illustrates a view of a television showing an eleventh view of the exemplary electronic program guide.
Figure 13:
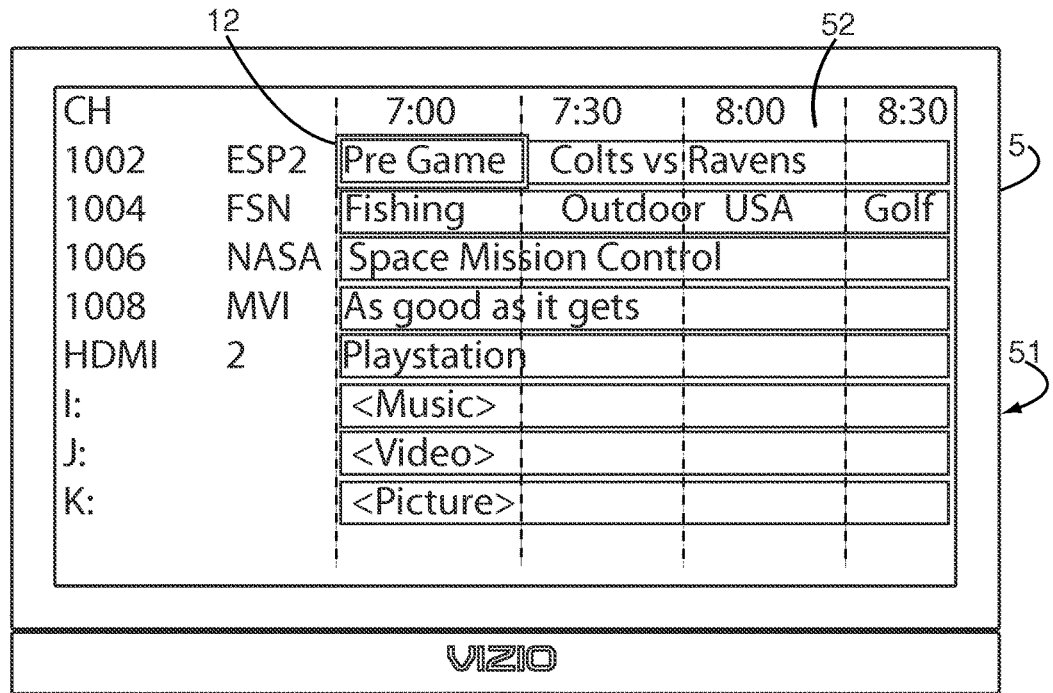
FIG. 13 illustrates a view of a television showing a twelfth view of the exemplary electronic program guide.
Figure 14:
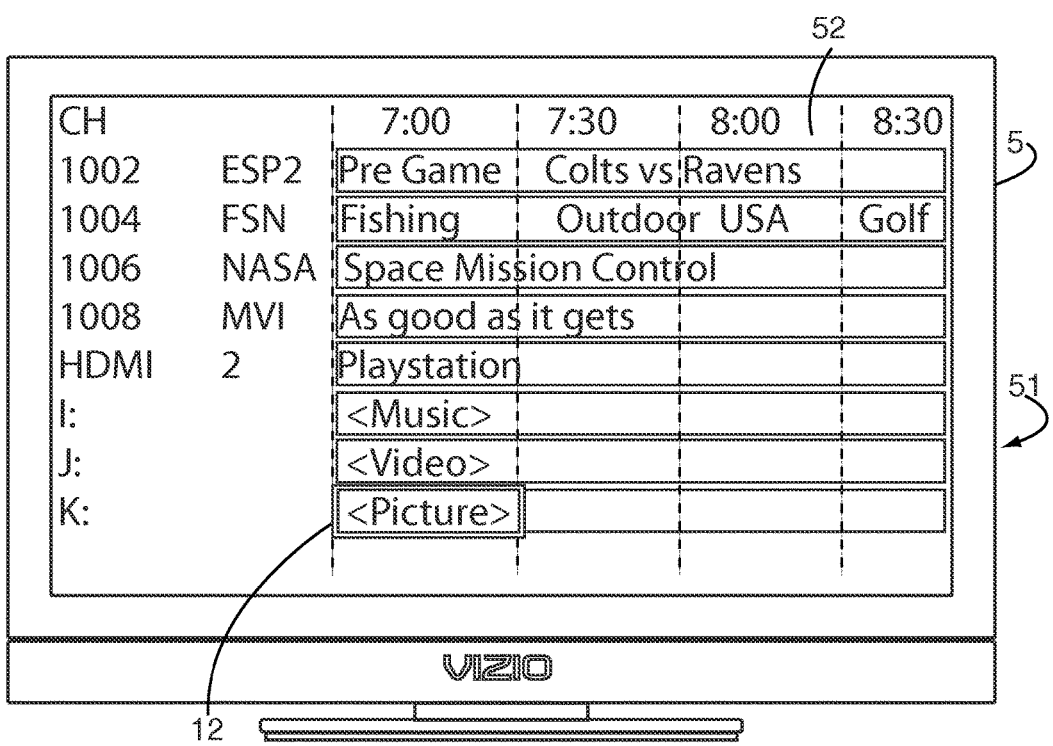
FIG. 14 illustrates a view of a television showing a thirteenth view of the exemplary electronic program guide.

Referring to FIGS. 12 and 13, views of a television 5 showing exemplary electronic program guide user interfaces 50/52 are shown. There are many ways to portray an electronic program guide on a display of, for example, a television 5, and the electronic program guide 50/52 described here within is but one example, wherein many other arrangements, formatting, highlighting, addressing mechanisms are anticipated, all of which are included here within.

In the exemplary user interface 50 shown in FIG. 12, there is a typical channel grid with the channel indicators (e.g. numbers) organized vertically (1000, 1002, etc) and time organized horizontally (e.g. 7:00, 7:30, etc). In some program guides, station identification (ESP1, ESP2, etc) are provided next to the channel indicators. At each grid intersection or spanning several horizontal grid intersections are content descriptions (e.g. Baseball Rays vs. Yankees) for each station.

For selecting a channel/program, a highlight selector 12 provides focus. As shown in FIG. 12, the highlight selector 12 is shown to be focused over the intersection of channel 1000 and the time 7:00, at which is the program, "Baseball Rays vs. Yankees." The typical remote control 111 (see FIGS. 22 and 23) has keys or controls to move the highlight selector 12, for example, up, down, left and right arrow keys, touch pads, etc. The viewer uses these keys to position the highlight selector 12 over a program of interest. In some systems, a fuller description of a program is provided in the user interface when the program is highlighted. In some user interfaces, pressing a different key (e.g. an "info" key) provides additional description of the program. In some user interfaces, after a "select" key is pressed, the television tunes to the channel that is currently highlighted. For example, in the program guide 50 shown in FIG. 12, after pressing the select, the television 5 (or set-top box, etc) tunes to channel 1000 to view the baseball game.

In the past, horizontal lines of such exemplary electronic program guide user interfaces 50 were restricted to tunable stations or channels. Many television devices 5 have alternate inputs connected to other devices such as cable/satellite receivers (set-top boxes), media players, etc. In the past, to view content from any of these devices, a different user interface was provided. For example, the remote control 111 had a dedicated key labeled "input" and, successive invocations of the "input" key transitioned the television device 5 sequentially through each of the possible inputs (e.g. Tuner→HDMI1→HDMI2→HDMI3→HDMI4→ Analog→ Tuner, etc). Often, the viewer becomes very accustomed to using the electronic program guide and associated remote control features and finds the input changing interfaces and finding special keys difficult to master, especially in low-lit rooms.

This exemplary electronic program guide interface 50 has, for example, three additional horizontal lines 51, one for an input selection (HDMI2) and two for access to content stored on, for example external storage referred to as "I:"

and "J:". Although the time slots are not necessarily used for the input port horizontal lines 11, the position in the exemplary electronic program guide user interface 50 are populated with a description of the devices attached to each input. For example, HDMI2 is connected to a PlayStation, "I:" has a folder for music and "J:" has a folder for video. It is anticipated that the description is entered through a setup user interface or is discovered automatically through the interface (e.g. HDMI interface). It is also anticipated that, in embodiments in which the description is discovered through the interface, the description optionally includes a description of content loaded or accessible from the device. For example, if the movie "Cars" is currently loaded in the PlayStation that is connected through HDMI2, then the description for HDMI2 is "PlayStation: Cars". Many variations are anticipated.

In FIG. 13, the viewer pressed the down arrow key enough times to move the cause scrolling. In this exemplary user interface 52, the first horizontal line (channel 1000) is gone and the subsequent channels (1002 to 1008) are moved up to fill the void. The input (HDMI2) and connected storage devices ("I:", "J:") 51 move up and a new line is added at the bottom, for example "K:" having on it "Pictures". Any form and combination of scrolling, including scrolling as described above are anticipated and included here within.

Figure 15:
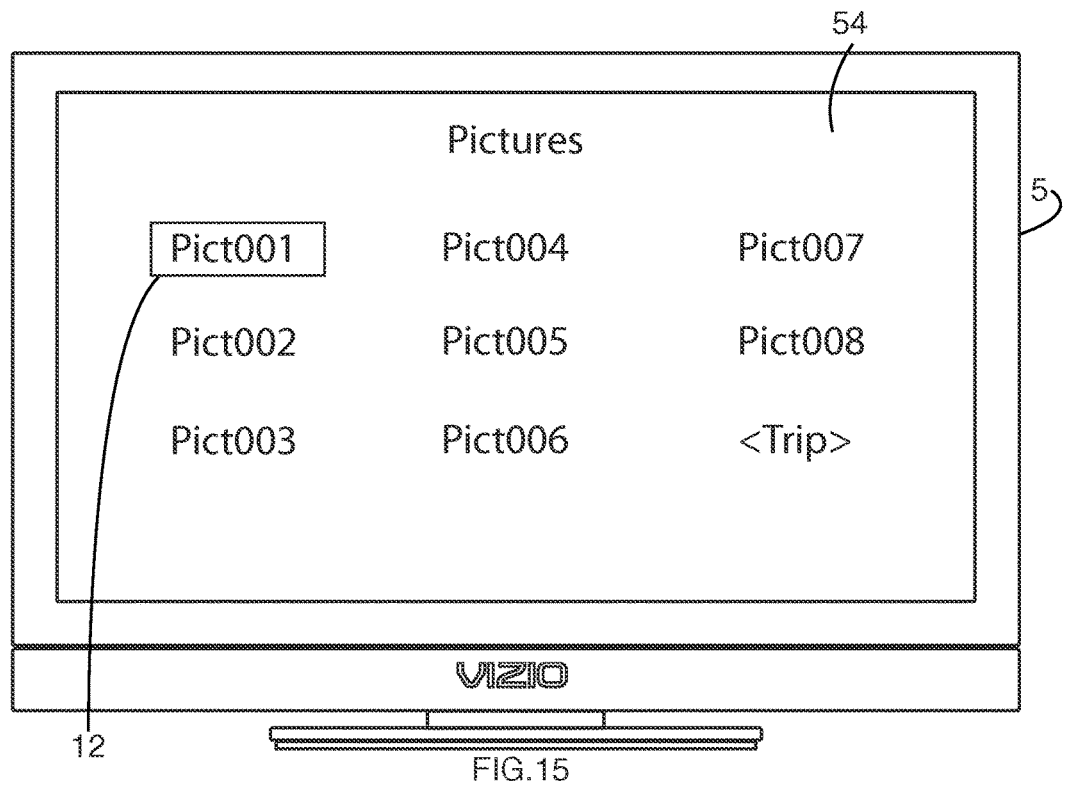
FIG. 15 illustrates a view of a television showing an exemplary disk content selection screen.
Figure 16:
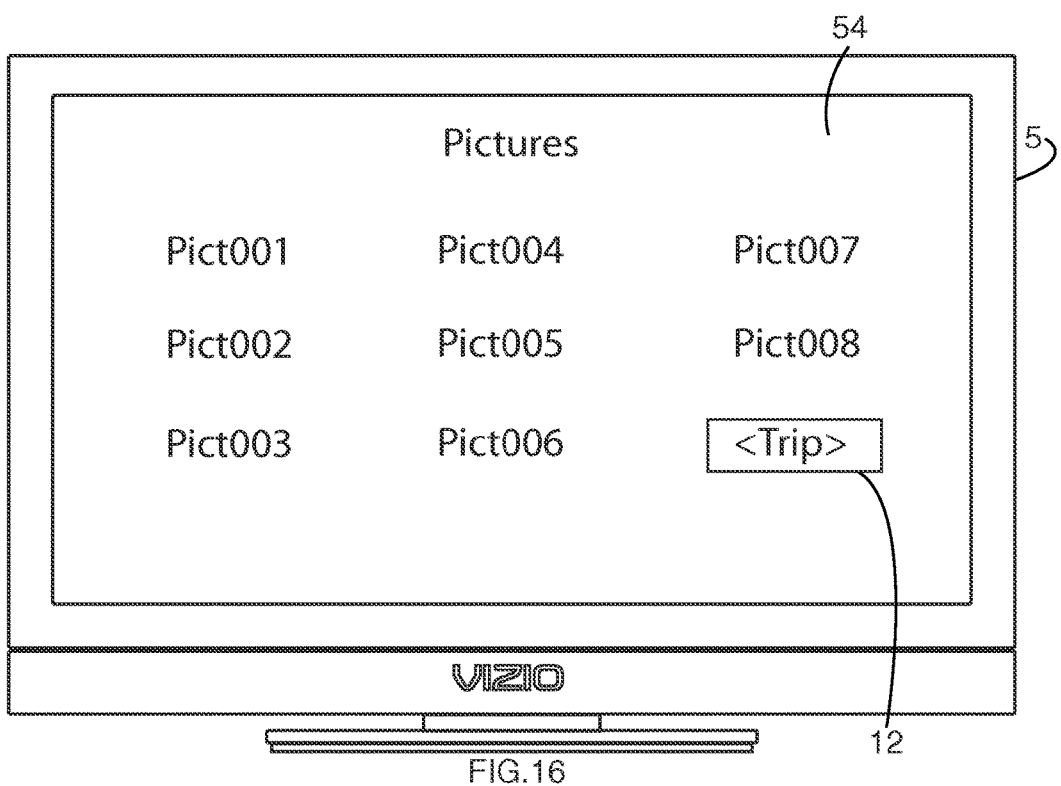
FIG. 16 illustrates a view of a television showing a second exemplary disk content selection screen.
Figure 17:
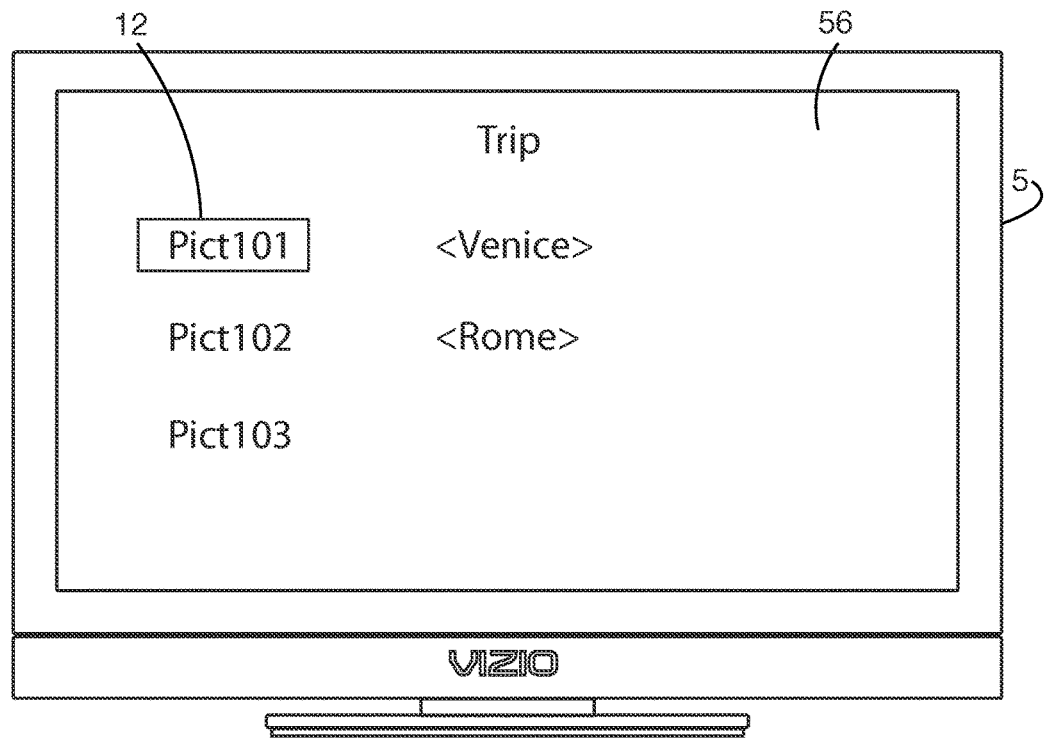
FIG. 17 illustrates a view of a television showing a third exemplary disk content selection screen.
Figure 18:
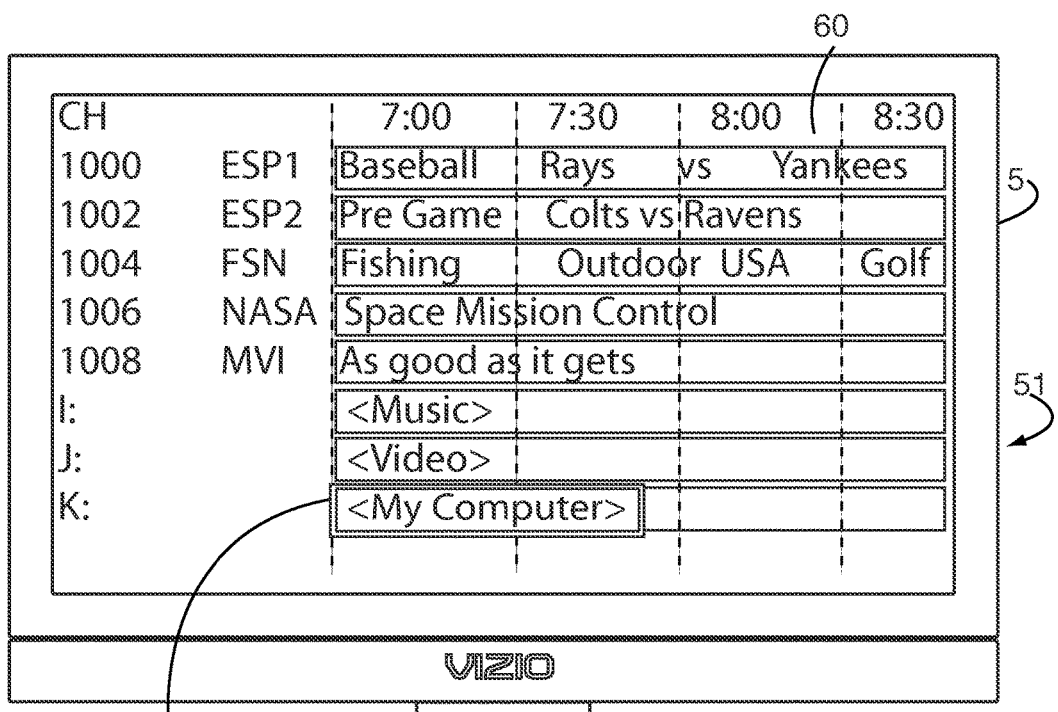
FIG. 18 illustrates a view of a television showing a fourth exemplary disk content selection screen.
Figure 19:
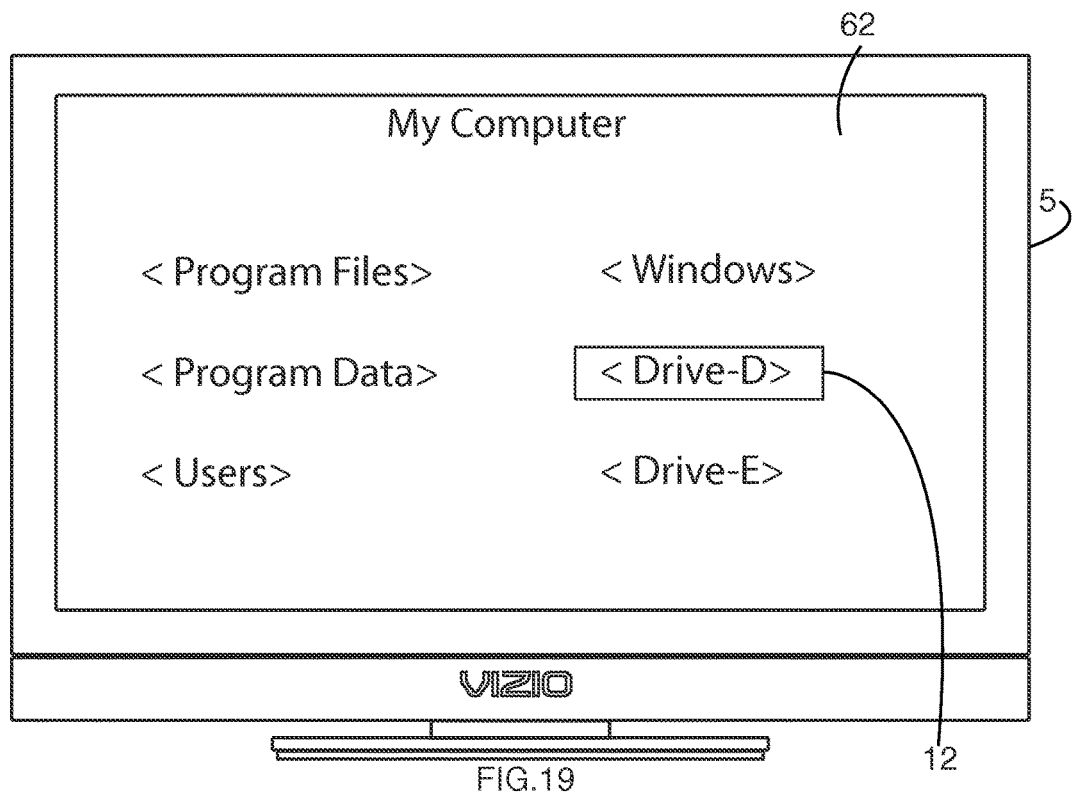
FIG. 19 illustrates a view of a television showing an exemplary computer explorer screen.

Referring to FIGS. 15-17, views of a television 5 showing an exemplary disk content selection screen 54/56 is shown. In this example, the highlight selector 12 was focused over "<Picture>" ("K:") and, for example, the select function was invoked resulting in an exploration user interface 54 as shown in FIG. 15. This is a much abbreviated exploration user interface 54 and many other features and capabilities are anticipated as known in the business. In this example, there are eight files (Pict001-Pict008) and one folder (Trip) stored on the "K:" storage device. The storage device ("K:") is, for example, a USB jump drive 8 (see FIG. 22) interfaced to a USB port of the television 5 or a network attached storage device (NAS) 4 (see FIG. 22). As shown in FIG. 16, the highlight selector 12 is positioned over "Trip" and the selection function was again invoked. This results in the exploration user interface 56 as in FIG. 17 being displayed. In this, the highlight selector 12 is positioned over a picture (Pict101). Invoking the selection function at this point results in the picture (Pict101) displayed on the television 5, similar to that in FIG. 21.

Referring to FIGS. 18-21, views of a television 5 showing exemplary content selection screens 60/62/64/66 will be described. In this, the bottom line of the electronic program guide user interface 60 shows an external device ("K:") with a description of "My Computer". This represents a simplified example of an external device such as a personal computer 2/6 (see FIG. 22), cellular phone, etc. In this example, the highlight selector 12 is positioned over "My Computer" and the selection function is invoked resulting in the exploration user interface 62 as in FIG. 19. In this, the viewer has access to several components of a networked computer system such as storage folders (Program Files, Program Data, Users, Windows) and two drives that are local to that computer 2/6 (Drive D: and Drive E:). Again this is greatly simplified. It is anticipated that devices such as the television 5 only have access to certain computer resources such as a shared folder, etc. The computer 2/6 is, for example, directly connected to the television 5 or connected to the television 5 through a local area network 3 or through a wide area network 80 (see FIG. 22).

Figure 20:
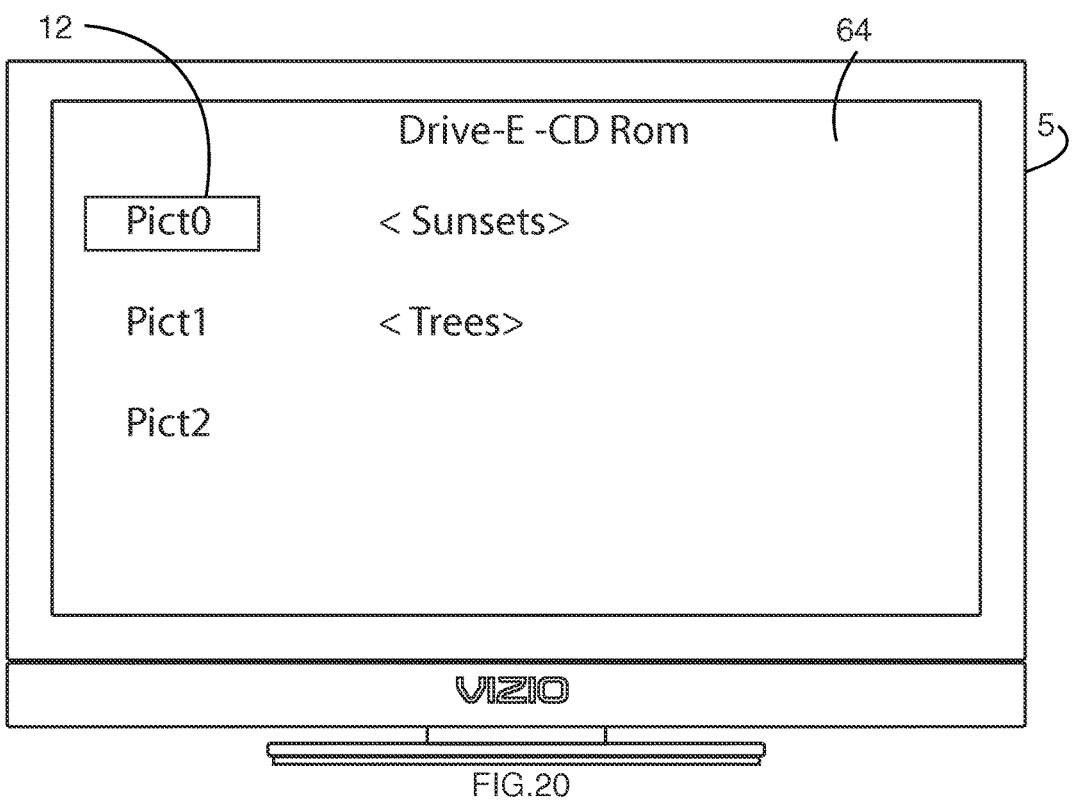
FIG. 20 illustrates a view of a television showing a second exemplary computer explorer screen.
Figure 21:
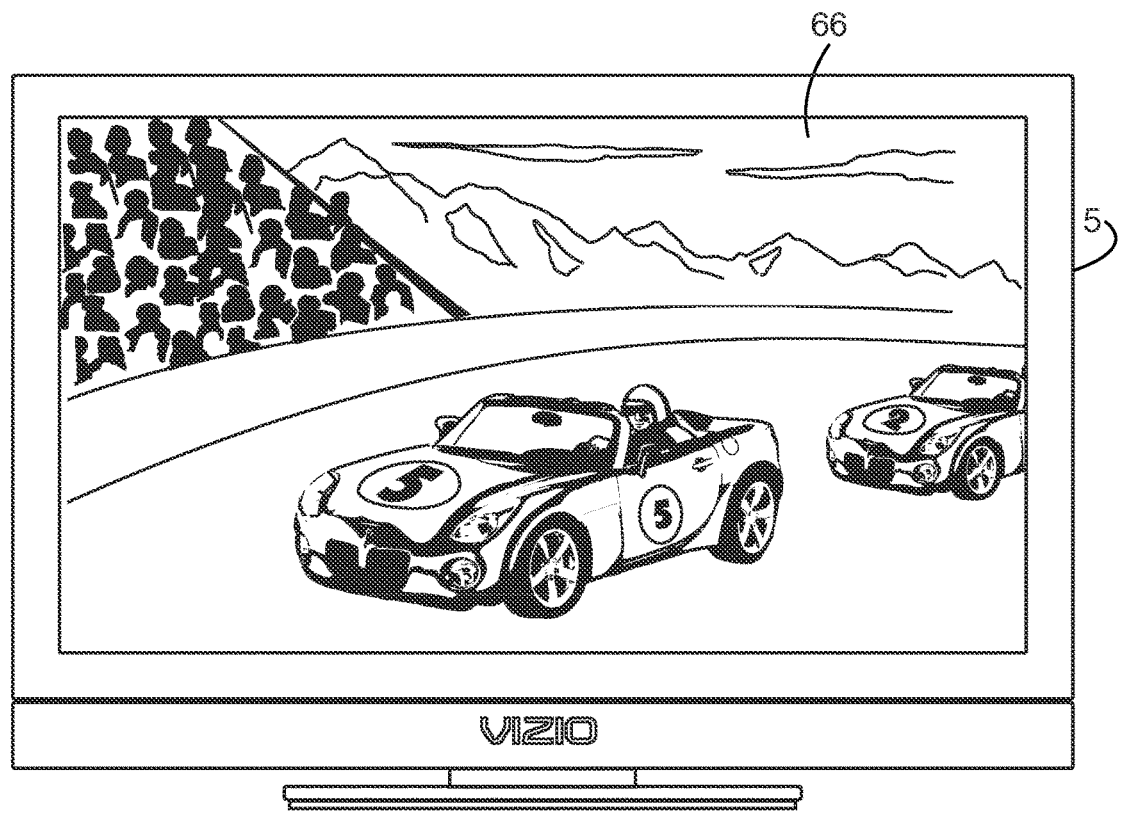
FIG. 21 illustrates a view of a television showing content from a remote source.

The highlight selector 12 is positioned over one of the disk drives (Drive-D) local to the computer 2/6 and the select function is invoked, bringing up an exploration user interface 64 as shown in FIG. 20, depicting the contents of storage media in the local disk drive. In this simplified example, there are three picture files (Pict0, Pict1, and Pict2) and two sub-folders (Sunsets and Trees). The highlight selector 12 is positioned over the first picture (Pict0) and the select function is invoked, accessing the storage media in the disk drive (Drive D) of the computer 2/6 and displaying the first picture 66 as shown in FIG. 21.

Figure 22:
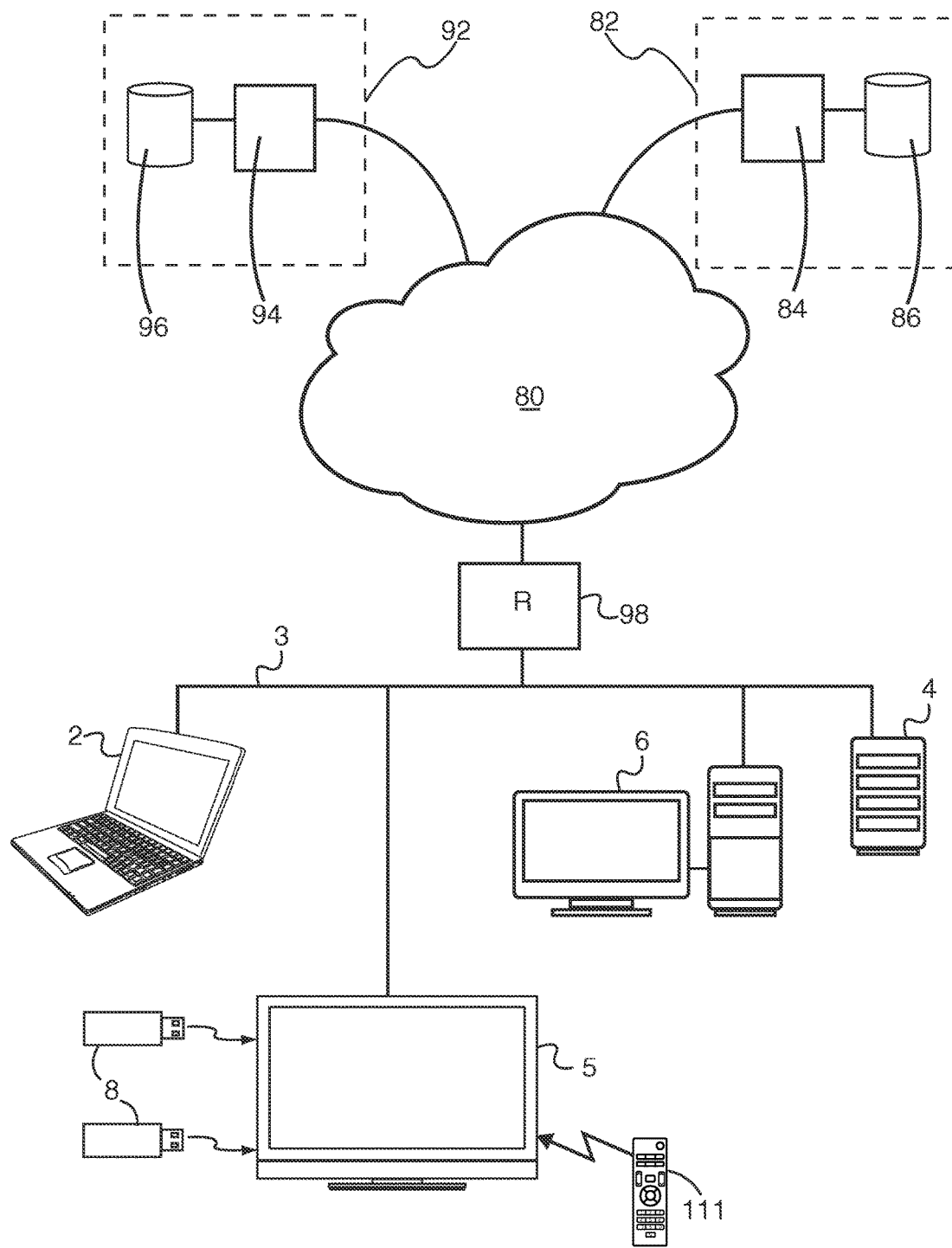
FIG. 22 illustrates a block diagram of a typical television system interfaced through a network to various search engines.

Referring to FIG. 22, a block diagram of a typical television 5 system interfaced to various devices 2/4/6/8 and/or services is described. The television 5 is shown with a wireless remote control 111 (e.g. infrared or radio frequency) and, in this example, is connected to a network 3, for example an Ethernet local area network 3, through any known network interface. This is an example of one network and the type of network is not limited and includes, for example, Ethernet (e.g. 802.3), WiFi (e.g 802.11), wireless adapters/routers, routers, bridges, phone lines networks, cable networks, fiber optic networks, etc. Likewise, other computers 2/6 are also connected to the network 3 through similar networking infrastructures. In this example, a network attached storage device 4 is also interfaced to the network 3.

As shown, one or more servers 84/94 are also operatively connected to the television 5 through the network 3, a modem 98 and wide area network 80 (e.g. Internet) as known in the industry. The devices 2/4/5/6/84/94 on the network 3 and wide-area network 80 (e.g. Internet) have addresses (e.g. MAC addresses URLs, etc) for establishing connections.

Some devices are directly connected to the television 5 as depicted by two USB jump drives 8 connected directly to USB ports of the television 5. Any known device is anticipated to be directly connected to the television 5 through any known connection (e.g. USB), including, but not limited to, backup storage devices, USB jump drives 8, DVD drives, Bluetooth Drives, etc.

The provider servers 84/94, for example, provide services as described above such as Netflix, Pandora, and Amazon. This is a simplified view of systems 82/92 that include one or more servers 84/94 and storage 86/96 for storing, for example content.

Figure 23:
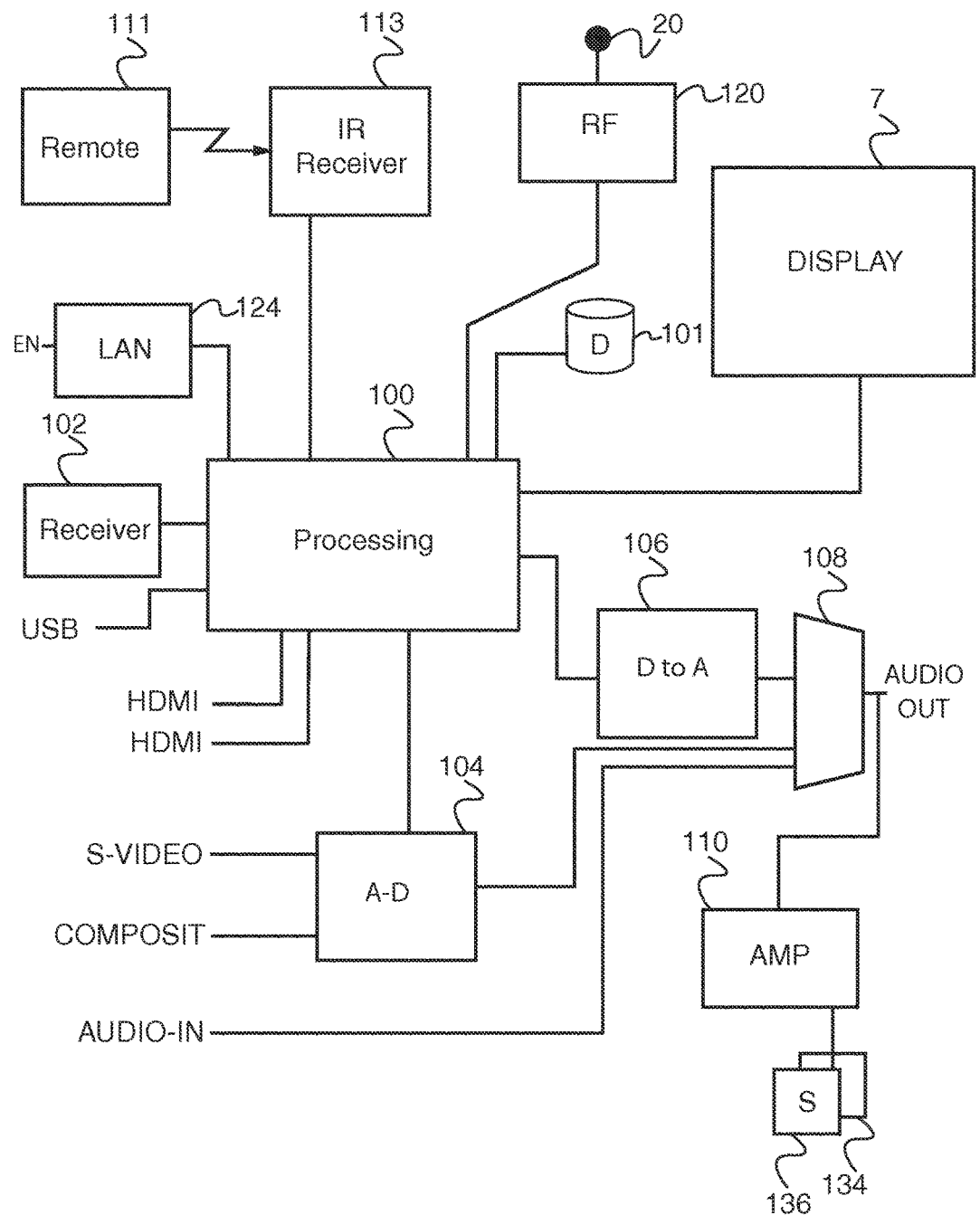
FIG. 23 illustrates a block diagram of a typical television system.

Referring to FIG. 23, a schematic view of exemplary televisions 5 is described. This figure is intended as a representative schematic of a typical monitor/television 5 and in practice, some elements are not present in some monitors/televisions 5 and/or additional elements are present in some monitors/televisions 5 as known in the industry. In this example, a display panel 7 for content is connected to a processing element 100. The display panel 7 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High Definition Multimedia Interface (HDMI 2-4), USB ports and an analog-to-digital converter 104. The analog-to-digital converter 104 accepts analog inputs from legacy video sources such as S-Video and Composite video and converts the analog video signal into a digital video signal before passing it to the processing element. At least one of the video inputs has provisions to include metadata either embedded in the video data or provided in alternate input channels or any way known in the industry. For example, metadata is received by the processing element 100 of the television 5 in packets within digital data.

In some embodiments the television 5 has local storage 101 is such as a hard disk or flash memory. This is useful for storing/caching content such as movies from services such as Netflix.

The processing element 100 accepts video inputs and audio inputs selectively from a variety of sources including an internal television broadcast receiver 102, High Definition Multimedia Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element 100. The processing element 100 controls the display of the video on the display panel 7.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 134/136.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In a preferred embodiment, the television 5 connects to the network/Internet 3 through a wireless network interface 120 having an antenna 20 or a local area network using a local area network adapter 124 for connecting to, for example, an Ethernet local area network or a power line local area network, as known in the industry. Any known network connection is anticipated. The processor 100 communicates to the Internet-based services (e.g. servers 84/94) through the wireless network interface 120 or the local area network 124.

Figure 24:
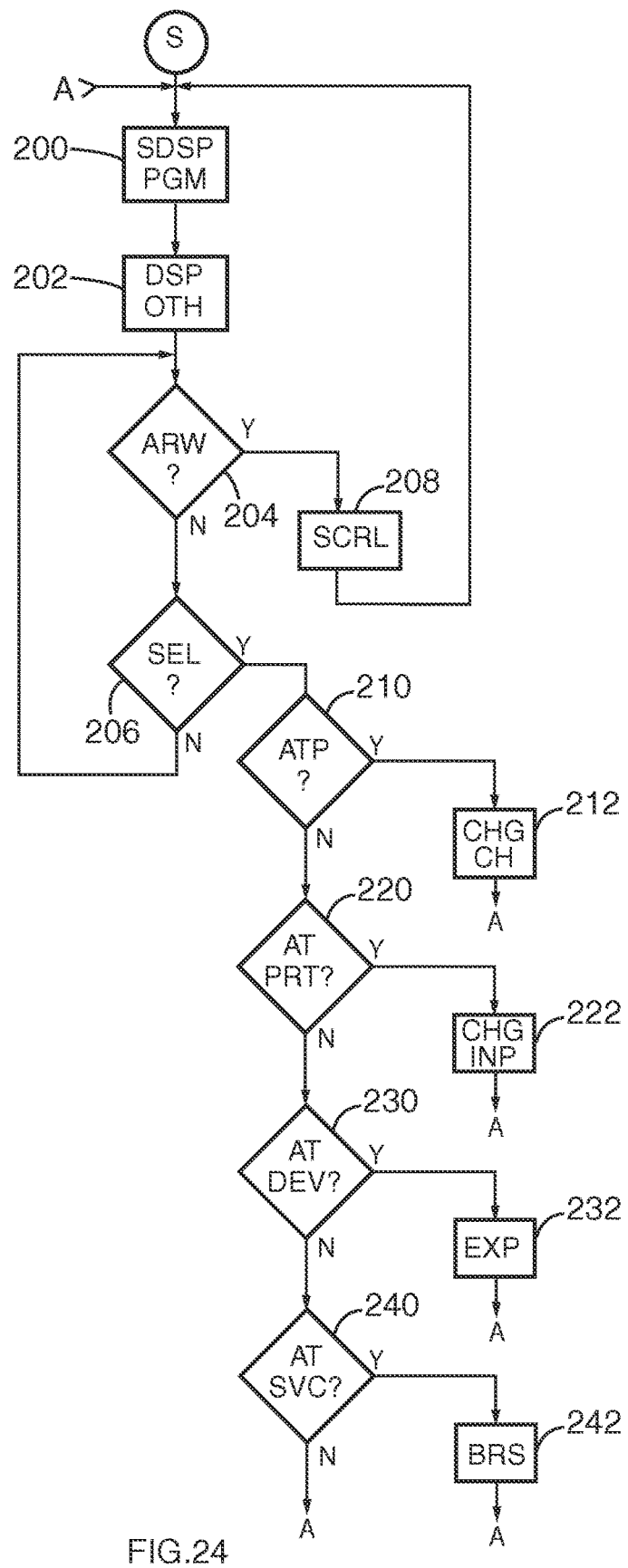
FIG. 24 illustrates a flow chart of a typical television system.

Referring to FIG. 24, a flow chart of a typical television system will be described. This exemplary flow depicts a typical program operating on a processor 100 of the television 5. In this, the program displays 200 one or more lines of programming information such as the television programs of FIGS. 1-14 and 18. The program also displays 202 one or more other lines. The other lines consist of any combination of input ports as in FIGS. 1-5, services as in FIGS. 6-10 and/or local or remote devices as in FIGS. 12-14 and 18. Next, the program waits for an input from, for example, the remote control 111. If the input is an arrow key 204 (e.g. up-arrow or down-arrow), the program changes focus of the highlight selector 12 or scrolls 208, then updates the display, for example, repeating the previous steps.

If the input is the select function 206 (e.g. the "select key of the remote control 111 was pressed), the next action depends upon the location of the highlight selector 12. If the highlight selector 12 is at a television program 210, then the channel of that television program is addressed by the television and the view will see that television program displayed on the display 7 of the television 5. Note, that other actions are anticipated as known in the industry, this being an example of which. For example, if the highlight selector 12 is at a television program that hasn't yet started, a record dialog is presented to, for example, record the television program when it begins and/or set a reminder to change to that channel when that television program begins.

If the highlight selector 12 is at an input port 220, then the current input of the television 5 is switched to that port 222. For example, if the highlight selector 12 is at "HDMI2", then the current input of the television 5 is switched to the second HDMI input.

If the highlight selector 12 is at a device 230, then an exploration program is run 232 to explore content on the device. For example, if the highlight selector 12 is at a storage device (e.g. a connected jump drive 8, a network attached storage device 8 or connected computer 2/6), the exploration program 232 displays content from that connected storage device 8/4 (or computer 2/6).

If the highlight selector 12 is at a service 240, then a browsing program is run 242 to explore services available on the service. For example, if the highlight selector 12 is at a movie rental service (e.g. Netflix), the browsing program 242 displays screens or web pages related to that service.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system comprising:
    a television having a network connection, and receiving programs over a broadcast program channel, the television having a display,
    the television displaying an electronic program guide on the display, the electronic program guide including program information for said programs that are received over said broadcast program channel, and the electronic program guide also showing information regarding other viewable programs that are not received over said broadcast program channel, and are received over said network connection; said television including a user interface that enables scrolling through a list of said programs that are received over said broadcast program channel, where both said programs and said other viewable programs are shown as entries on the list, and said programs are reached by scrolling vertically up and down to select a channel and scrolling horizontally to select a time on the channel, and where the scrolling provides different screens showing different ones of said programs at different positions of a focus of said scrolling, and where said screen shows, as part of said list of programs and in a first row that is reached by said scrolling up and down, said other viewable programs, wherein said other viewable programs include a service that delivers content over the internet, and does not have information in the horizontal direction, wherein the electronic program guide comprises horizontal rows and each row describes either a program or another viewable program; and wherein said rows show different programs but always shows said other viewable programs, and
  where selecting one of said other viewable programs that represents a first service connects over the internet to a server associated with the first service, and displays a web page on the display and provides a user interface that is formatted for a television interface, and allows for searching for specific content on an internet repository of the first service.

2. The system of claim 1, wherein said first service is a movie rental service.

3. The system of claim 2, wherein said user interface has a search function for searching the internet repository.

4. The system of claim 1, wherein said other viewable programs also include external inputs to the television.

5. The system of claim 4, wherein the program guide shows information about specific content that is playing on said external inputs.

6. The system of claim 1, further comprising a receiver that operates to accept viewer directives from a remote control.

7. A method of viewing a program guide on a television that has a display and has a network connection, the method comprising:
  (a) displaying television program information in an electronic program guide on the display, the television program information comprising channel and program data in rows and columns for at multiple television programs received over a broadcast program channel, where the rows represent different channels and the columns represent different times;
  (b) displaying in the electronic program guide a description of at least one of other viewable programs that are not received over said broadcast program channel, and are received over said network connection as a row that has no additional data associated with the columns and that delivers content over the Internet;
  (c) displaying a highlight selector over a current location, the current location at either one of the television programs or at one of the descriptions of the other viewable programs;
  (d) receiving a directive;
  (e) if the directive is a directional directive, changing the current location and repeating from step a;
  (f) if the directive is a selection directive and the current location is over one of the television programs, changing a current channel of the television to the one of the television programs; and
  (g) if the directive is a selection directive and the current location is over one of the descriptions of the services, connects over the internet to a server associated with the first service, and displays a web page on the display and provides a user interface that is formatted for a television interface, and allows for searching for specific content on an internet repository of the first service wherein the electronic program guide comprises row that each describe either a program channel or the other viewable programs, where both said programs and said other viewable programs are shown as rows, which are reached by scrolling vertically.

8. The method of claim 7, wherein the other viewable programs include a movie rental service.

9. The method of claim 7, wherein the other viewable programs include an information service.

10. The method of claim 7, wherein the other viewable programs include external inputs to the television.

11. The method of claim 10, wherein the electronic program guide shows information about specific content that is playing on said external inputs.

12. The method of claim 7, further comprising one or more additional services from one or more additional provider servers and the electronic program guide further comprises lines that describe the one or more additional services.

13. The method of claim 7, wherein the browsing menu comprises a display of web pages from a provider and accepts viewer directives from a remote control.

14. A television comprising:
  a receiver of multiple channels of program information;
  an internet connection;
  a processor, having access to said program information regarding content of said program information, the content available on multiple channels of said program information accessible by the television, said processor also having access to at least one service that delivers content over the internet from said internet connection;
  a display operably interfaced to the processor, operating to display said program information and to display a menu showing said content;
  at least one other viewable program, including at least one service hosted by a provider server over the internet, the other viewable programs being accessible by the processor through a network;
  software running on the processor displays on the display a subset of the program information with channels defined in rows which are vertically stacked in an electronic program guide and times defined in columns that are horizontally stacked in a row, and information regarding the at least one service in an electronic program guide is vertically stacked in said electronic program guide with no additional information in said columns, where different portions of said program guide can be seen at different times, said different portions showing different ones of said multiple channels said at least one other viewable program; and
  software running on the processor which operates for displaying a highlight selector on the electronic program guide, where said highlight selector is moved between said viewable program or said channel and time, and where selecting one of said other viewable programs that represents a first service connects over the internet to a server associated with the first service, and displays a web page on the display and provides a user interface that is formatted for a television interface, and allows for searching for specific content on an internet repository of the first service.

15. The television of claim 14, further comprising software running on the processor that relocates the highlight selector responsive to directional inputs from a remote control.

16. The television of claim 14, further comprising software running on the processor that changes a current channel of the television to one of the channels responsive to a selection input from a remote control when the highlight selector is located at the one of the channels.

17. The television of claim 14, further comprising software running on the processor that presents a browsing user interface on the display responsive to a selection input from a remote control when the highlight selector is located at the service information associated with the one of the at least one services.

18. The television of claim 14, wherein the provider server is accessible by the processor through the network and the network includes a wide area network.

19. The television of claim 18, wherein the wide area network is the Internet.

20. The system as in claim 1, wherein said broadcast program channel includes cable TV channels.

21. The system as in claim 1, wherein said broadcast program includes broadcast TV channels.

22. The system as in claim 1, wherein at least a plurality of said other viewable programs are assigned with unused channel numbers.

23. The method as in claim 7, wherein at least a plurality of said other viewable programs are assigned with unused channel numbers.

24. The apparatus as in claim 14, wherein at least a plurality of said other viewable programs are assigned with unused channel numbers.

\* \* \* \* \*